(12) United States Patent
Asanuma et al.

(10) Patent No.: US 11,675,988 B2
(45) Date of Patent: Jun. 13, 2023

(54) IMAGE PROCESSING APPARATUS, CONTROL METHOD OF IMAGE PROCESSING APPARATUS, AND STORAGE MEDIUM

(71) Applicant: CANON KABUSHIKI KAISHA, Tokyo (JP)

(72) Inventors: Tomoya Asanuma, Kanagawa (JP); Shinya Omori, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 118 days.

(21) Appl. No.: 17/243,095

(22) Filed: Apr. 28, 2021

(65) Prior Publication Data
US 2021/0342562 A1    Nov. 4, 2021

(30) Foreign Application Priority Data
May 1, 2020 (JP) .............................. JP2020-081193

(51) Int. Cl.
| G06K 7/14 | (2006.01) |
| G06V 20/62 | (2022.01) |
| H04N 23/69 | (2023.01) |
| H04N 23/695 | (2023.01) |

(52) U.S. Cl.
CPC .......... *G06K 7/1443* (2013.01); *G06K 7/146* (2013.01); *G06K 7/1413* (2013.01); *G06K 7/1456* (2013.01); *G06V 20/62* (2022.01); *H04N 23/69* (2023.01); *H04N 23/695* (2023.01)

(58) Field of Classification Search
CPC .. G06K 7/1443; G06K 7/1413; G06K 7/1456; G06K 7/146; G06K 7/1417; H04N 5/23299; H04N 5/23296; G06V 20/62
USPC .......................... 235/462.09, 462.08, 462.01
See application file for complete search history.

(56) References Cited

U.S. PATENT DOCUMENTS

| 2003/0137517 A1* | 7/2003 | Kondo .................. G06T 15/205 345/474 |
| 2012/0070086 A1 | 3/2012 | Miyamoto |
| 2015/0125032 A1* | 5/2015 | Yamanaka .............. G06T 7/254 382/103 |

(Continued)

FOREIGN PATENT DOCUMENTS

CN                102004918 A  *  4/2011    ......... G06K 9/00228

*Primary Examiner* — Edwyn Labaze
(74) *Attorney, Agent, or Firm* — Canon U.S.A., Inc. IP Division

(57) ABSTRACT

An apparatus detects a plurality of areas from an overall image, determines on each of the plurality of areas whether the area is a candidate for an area including an object as a processing target based on a determination reference value (first determination processing), acquires a zoom-in image of the area determined to be the candidate for the area including the object in the first determination processing, and determines whether the acquired zoom-in image is an image of the object (second determination processing). The apparatus identifies an area, in the overall image, corresponding to the zoom-in image determined not to be the image of the object in the second determination processing, and performs control to update the determination reference value used in the first determination processing based on image information of the identified area in the overall image.

18 Claims, 19 Drawing Sheets

(56) References Cited

U.S. PATENT DOCUMENTS

| | | | |
|---|---|---|---|
| 2016/0381282 A1* | 12/2016 | Bandlamudi | H04N 23/69 |
| | | | 348/240.3 |
| 2017/0287147 A1* | 10/2017 | Takahashi | G06T 7/35 |
| 2017/0293788 A1 | 10/2017 | Taira | |
| 2020/0344406 A1* | 10/2020 | Takeuchi | H04N 5/232122 |

* cited by examiner

FIG.10

| DATA TYPE | 006: 1D CODE READING PROCESSING ▽ |

NUMBER OF DATA: 30 ⇕  [GENERATE]

CONTENTS:

| UNIT NO. | NAME |
|---|---|
| 008 | DATA 1 |
| 009 | DATA 2 |
| 010 | DATA 3 |
| 011 | DATA 4 |
| 012 | DATA 5 |
| 013 | DATA 6 |
| 014 | DATA 7 |
| 015 | DATA 8 |

[OK]  [CANCEL]

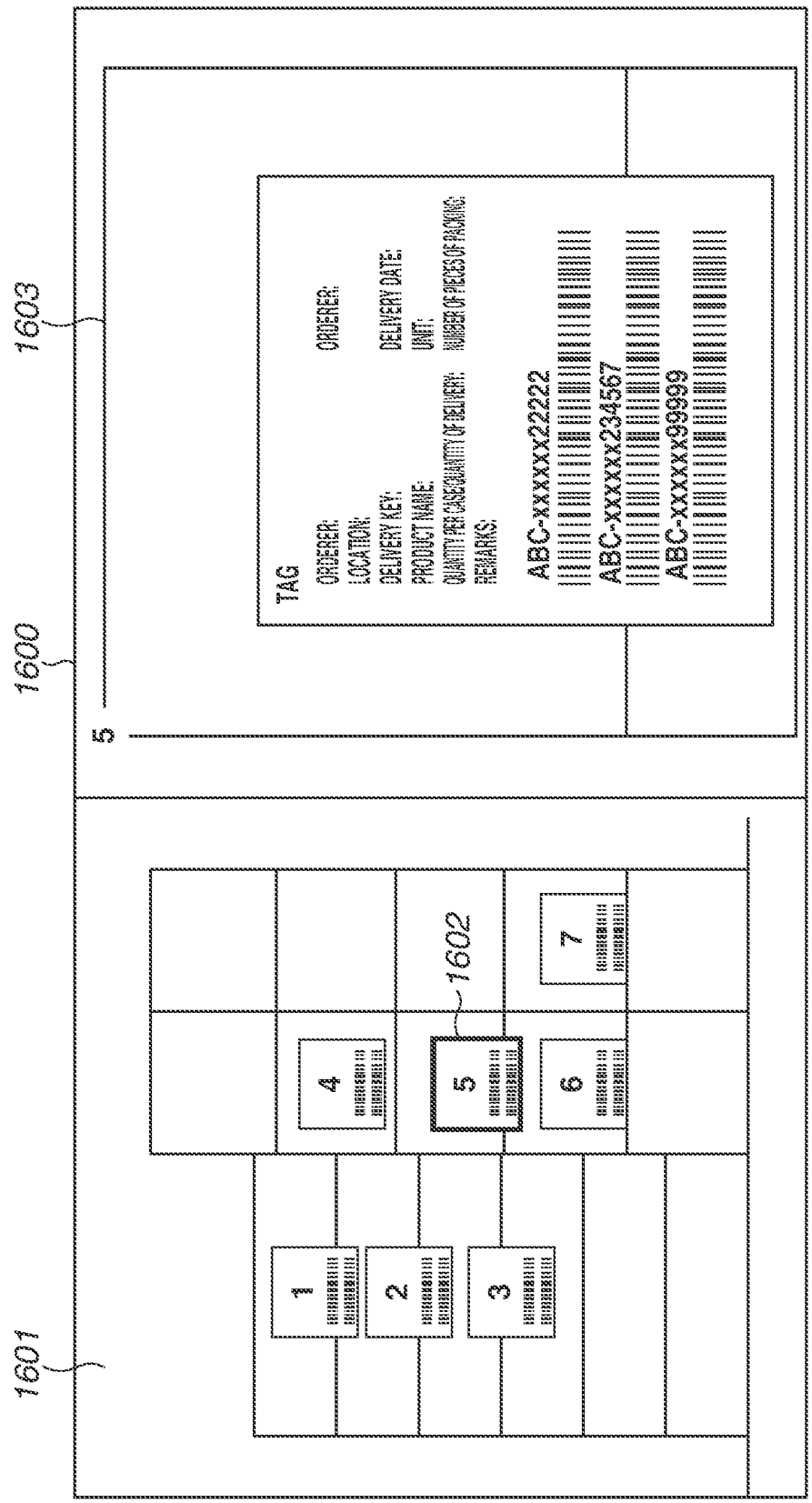

1801 THRESHOLD IS UPDATED

IMAGE PROCESSING APPARATUS, CONTROL METHOD OF IMAGE PROCESSING APPARATUS, AND STORAGE MEDIUM

BACKGROUND OF THE DISCLOSURE

Field of the Disclosure

The aspect of the embodiments relates to an image processing apparatus, a control method of the image processing apparatus, and a storage medium.

Description of the Related Art

In these days, a system capable of controlling panning, tilting, and zooming of a camera installed in a remote location from a terminal on a monitoring side via a network is being widely spread. United States Patent Application Publication No. 2017-0293788 discusses a technique of roughly searching for a barcode, and enlarging and capturing an image of the detected barcode by performing panning, tilting, and zooming operations to acquire a barcode image with a high resolution in such a monitoring system. In addition, United States Patent Application Publication No. 2012-0070086 discusses a technique of capturing an image including a plurality of reading targets, sequentially identifying positions of the reading targets, and sequentially performing reading processing by focusing on the identified positions.

In such a monitoring system, an excessive detection (overdetection) to a certain degree is performed by setting a low determination threshold for detection to acquire a desired image without omission. However, there is an issue that frequently performing such overdetection increases a load in subsequent processing steps, thereby requiring longer time for overall processing.

SUMMARY OF THE DISCLOSURE

According to an aspect of the embodiments, an apparatus comprising: a processor; and a memory storing a program which, when executed by the processor, causes the processor to: detect a plurality of areas from an image; execute first determination processing on each of the plurality of areas to determine whether each of the plurality of areas is a candidate for an area including a specific object based on a determination reference value stored in a storage unit; control an imaging apparatus to capture a zoom-in image of an area, out of the plurality of areas, determined as the candidate for the area including the specific object in the first determination processing; receive the captured zoom-in image from the imaging apparatus; execute second determination processing on the zoom-in image to determine whether the zoom-in image includes the specific object; and identify the area corresponding to the zoom-in image determined not to include the specific object in the second determination processing, and update the determination reference value based on image information of the identified area.

Further features of the disclosure will become apparent from the following description of exemplary embodiments with reference to the attached drawings.

BRIEF DESCRIPTION OF THE DRAWINGS

FIG. 10 is a diagram illustrating an example of a file.

FIG. 16 is a diagram illustrating an example of a captured-image screen.

DESCRIPTION OF THE EMBODIMENTS

Exemplary embodiments of the disclosure will be described with reference to the accompanying drawings.

<Overall Configuration of Image Processing System>

Figure 1:
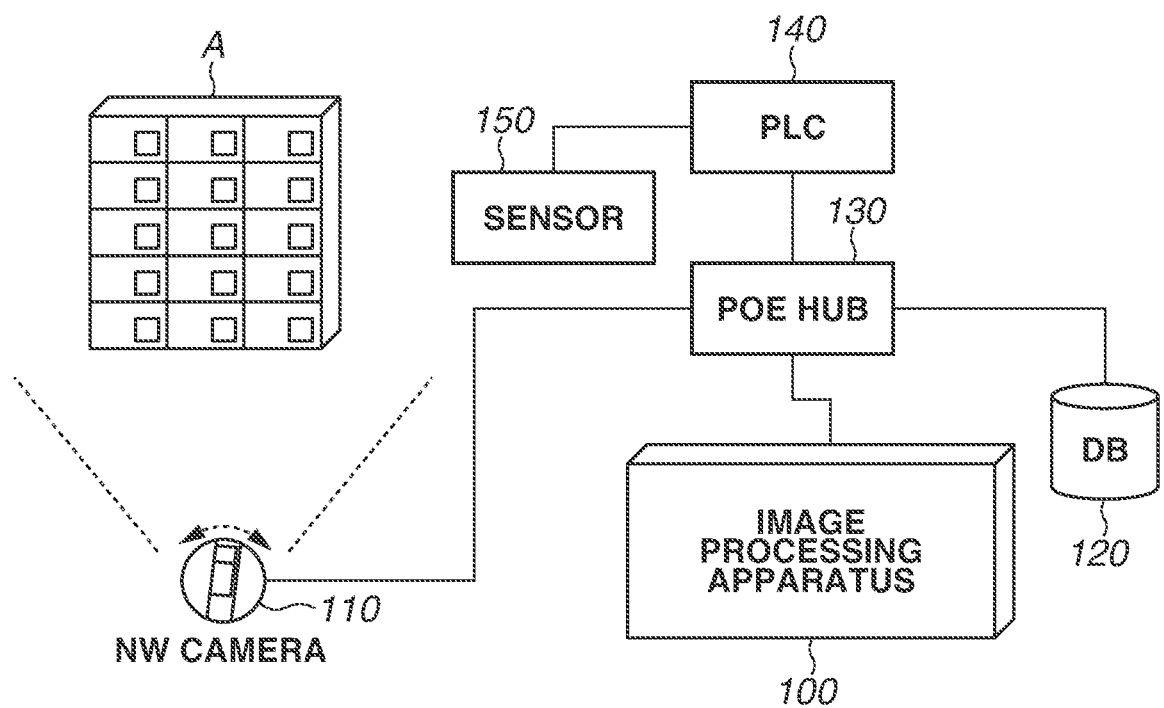
FIG. 1 is a block diagram illustrating an overall configuration of an image processing system.

FIG. 1 is a block diagram illustrating an overall configuration of an image processing system. An image processing system according to a first exemplary embodiment is a system to capture an image of loaded packages delivered to a factory or the like, read a barcode attached to each of the loaded packages, and collate the barcode with a preliminarily registered content of the barcode to check if the loaded packages or the like have been delivered as scheduled. Furthermore, in the present exemplary embodiment, assume that a tag is attached to each package included in the loaded packages, which are image-capturing targets, and a barcode is described in each tag. The image processing system according to the present exemplary embodiment sequentially reads the barcode described in each tag attached to each package and performs collation. While a description will be given of a case where an object as a target for reading and collation processing performed by an image processing apparatus 100 is a barcode, the object as the target for the reading and collation processing is not limited to the barcode.

Other examples of the object as the target for the reading processing may include numbers, a character string composed of characters and symbols, and a quick response (QR) code.

The image processing system includes the image processing apparatus 100, a network (NW) camera 110, a database (DB) 120, and a Power over Ethernet (PoE) hub 130. The image processing system also includes a programmable logic controller (PLC) 140 and a sensor 150.

The PoE hub 130 is connected to the image processing apparatus 100, the NW camera 110, the DB 120, and the PLC 140, and communicates with each unit, and supplies power to each unit. A content of a barcode described in each of a plurality of tags attached to a corresponding one of a plurality of packages to be delivered has been registered in the DB 120 in advance. The PLC 140 controls the overall image processing system. The sensor 150 detects that each of loaded packages has been delivered to a predetermined location.

The image processing apparatus 100 is connected to the NW camera 110 via the PoE hub 130, and controls the NW camera 110 to capture an image by transmitting a control command, which will be described below, to the NW camera 110. The NW camera 110 is installed so as to capture an image of a location to which a loaded packages A is delivered, and captures an image of the loaded packages A under control of the image processing apparatus 100. The loaded packages A are a result of heaping a plurality of packages to which tags are attached. The image processing apparatus 100 further receives the image acquired by the NW camera 110 via the PoE hub 130. The image processing apparatus 100 detects an image of the tag in which a barcode is described from the received image, and reads the barcode. The image processing apparatus 100 collates information of the barcode read from the image with information of the barcode stored in the DB 120. With this processing, it is possible to check if the package or the like has been delivered as scheduled. While the description is given of the example of delivery of packages in the present exemplary embodiment, the present exemplary embodiment can be applied to collation at the time of carrying out the packages.

<Configuration of Image Processing Apparatus 100>

Figure 2:
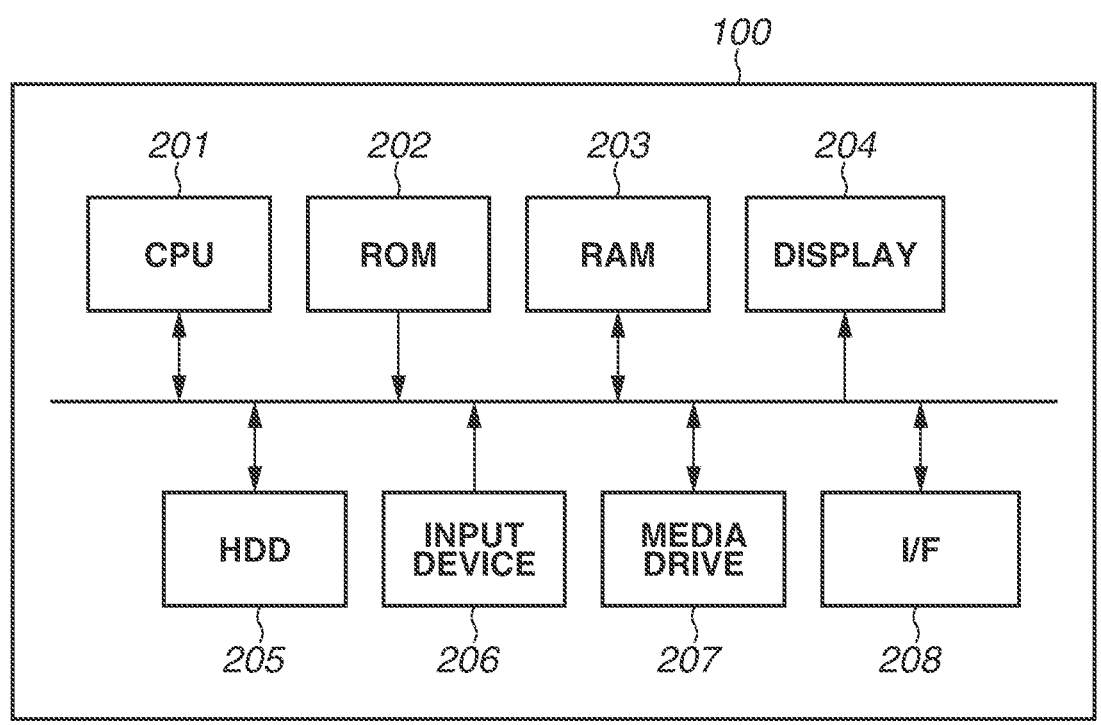
FIG. 2 is a block diagram illustrating a hardware configuration of an image processing apparatus.

FIG. 2 is a block diagram illustrating a hardware configuration of the image processing apparatus 100. The image processing apparatus 100 includes a central processing unit (CPU) 201, a read-only memory (ROM) 202, a random-access memory (RAM) 203, a display 204, a hard disk drive (HDD) 205, an input device 206, a media drive 207, and an interface (I/F) 208. The CPU 201 reads out a control program stored in the ROM 202 to execute various kinds of processing. The RAM 203 is used as a main memory of the CPU 201, and a temporary storage area such as a work area. The HDD 205 stores various kinds of data, various kinds of programs, and the like. The display 204 displays various kinds of information. The input device 206 accepts various kinds of operations performed by a user. The media drive 207, for example, reads out data from a medium such as a Secure Digital (SD) card and writes data to the medium. The I/F 208 communicates with an external apparatus.

Functions and processing of the image processing apparatus 100, which will be described below, are implemented by the CPU 201 reading out a program stored in the ROM 202 or the HDD 205, and executing the program. Alternatively, as another example, the CPU 201 may read out a program stored in a storage medium such as an SD card, instead of the ROM 202 or the HDD 205. As still another example, at least part of the functions and processing of the image processing apparatus 100 may be implemented by causing a plurality of CPUs, a plurality of RAMs, a plurality of ROMs, and a plurality of storages to cooperate with one another. In addition, as still another example, at least part of the functions and processing of the image processing apparatus 100 may be implemented by using a hardware circuit.

<Configuration of NW Camera 110>

Figure 3:
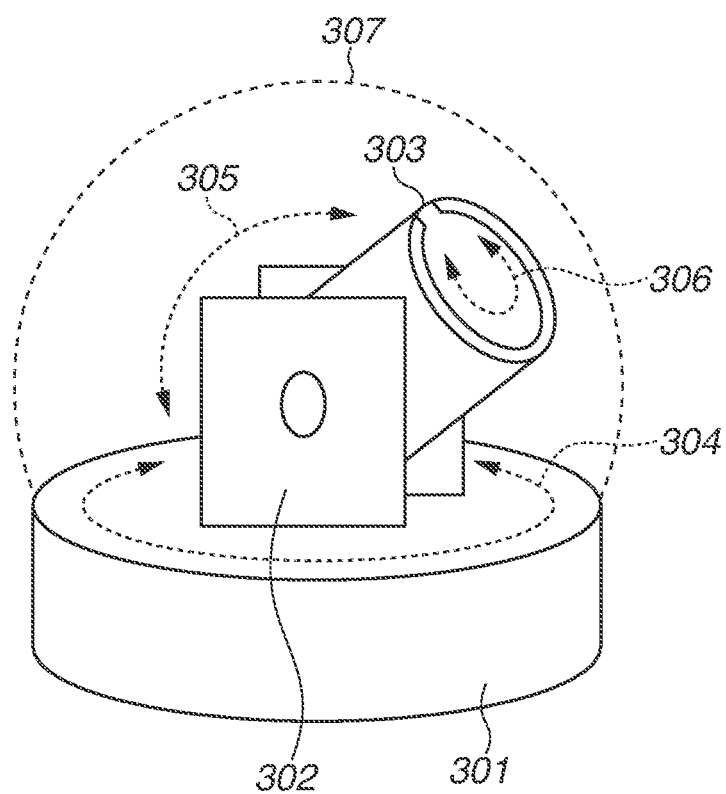
FIG. 3 is a diagram illustrating an external view of a network (NW) camera.

FIG. 3 is an external view of the NW camera 110. A pan driving unit 301 changes an orientation of a lens barrel unit 303 in a direction indicated by a pan direction 304 by driving a pan motor. A tilt driving unit 302 changes the orientation of the lens barrel unit 303 in a direction indicated by a tilt direction 305 by driving a tilt motor. In addition, the lens barrel unit 303 including a lens can be rotated about a center position of the lens in a direction indicated by a rotation direction 306 by being driven by a rotation motor. Furthermore, the lens barrel unit 303 includes a focus lens and a zoom lens, each of which is driven by a stepping motor. The whole of the NW camera 110 is covered with a dome 307.

Figure 4:
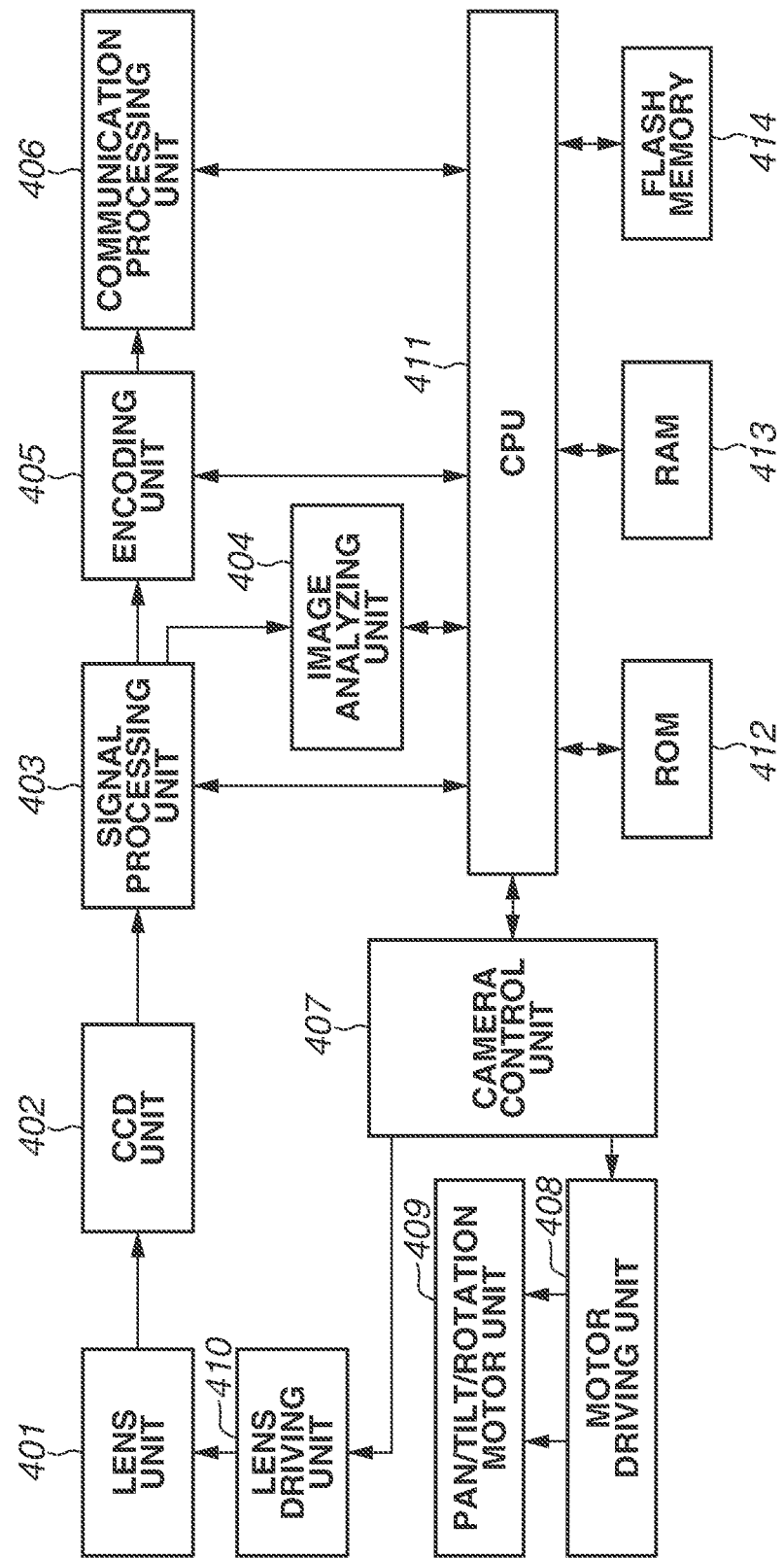
FIG. 4 is a block diagram illustrating a hardware configuration of the NW camera.

FIG. 4 is a block diagram illustrating a hardware configuration of the NW camera 110. The NW camera 110 is an imaging apparatus capable of communicating with an external apparatus via the network. The NW camera includes a lens unit 401, a charge-coupled device (CCD) unit 402, a signal processing unit 403, an image analyzing unit 404, an encoding unit 405, and a communication processing unit 406. A description will be given of processing until delivering image data captured by the NW camera 110 to the image processing apparatus 100. An optical image obtained through the lens unit 401 is converted to red, green, blue (RGB) digital data by the CCD unit 402, and is then transmitted to the signal processing unit 403. The signal processing unit 403 performs processing of converting the RGB digital data to digital data (image data) in a YCbCr 4:2:0 format or a YCbCr 4:2:2 format, processing of converting a size of the data to a required image size of an image to be transmitted, and various kinds of filtering processing. The processed image data is simultaneously transmitted to the image analyzing unit 404 and the encoding unit 405. The image data is then transmitted to an external apparatus via the network by the communication processing unit 406.

The encoding unit 405 executes processing of coding and compressing the image data to a predetermined format, for example, an H.264 format or a Joint Photographic Experts Group (JPEG) format. The communication processing unit 406 transmits H.264 video stream data or each JPEG still image data generated by the encoding unit 405 to the image processing apparatus 100 in accordance with a network protocol such as Transmission Control Protocol/Internet Protocol (TCP/IP), Hypertext Transfer Protocol (HTTP), and Real-time Transport Protocol (RTP).

The image analyzing unit 404 performs processing of analyzing captured image data and detecting whether a subject or an image pattern of a designated condition is included in a target image. Each processing block of the signal processing unit 403, the image analyzing unit 404, the encoding unit 405, and the communication processing unit 406 is connected to a CPU 411. A camera control unit 407 is connected to a motor driving unit 408 and a lens driving unit 410. Following an instruction from the CPU 411, the camera control unit 407 outputs control signals for pan/tilt/rotation operations (movement in the pan direction, movement in the tilt direction, and rotation about an optical axis) of the camera, and control signals for zooming and autofocusing (AF) operations.

In addition, the camera control unit 407 controls at least one of a visible range and a movable range of the NW camera 110 based on at least one of a visible range setting and a movable range setting stored in a RAM 413. The motor driving unit 408 includes a motor driving circuit, and is capable of changing an imaging direction of the camera by rotation of a pan/tilt/rotation motor 409 by driving the pan/tilt/rotation motor 409 in response to a control signal output from the camera control unit 407. The lens driving unit 410 includes a motor and a motor driving circuit to perform each driving such as AF, and is controlled based on a control signal from the camera control unit 407.

The CPU 411 controls operations of the entire apparatus by executing a control program stored in a ROM 412. The CPU 411 is connected to the ROM 412, the RAM 413, and a FLASH® memory 414. In addition, the CPU 411 is also connected to the signal processing unit 403, the image analyzing unit 404, the encoding unit 405, and the communication processing unit 406, and controls each processing block by starting and stopping operations, making settings for operation conditions, acquiring results of operations, and the like, for each processing block. The ROM 412 stores programs and data to be used by the CPU 411 to perform control of the NW camera 110 such as application processing.

The RAM 413 is a memory to write and read out data when the CPU 411 executes a program stored in the ROM 412. The RAM 413 includes a work area, a temporary save area, and the like to be used by the CPU 411 to execute the program for controlling the NW camera 110. The RAM 413 stores at least one of the visible range setting to designate a range of a field angle in which an image can be captured, or the movable range setting to designate a movable range in the pan direction, the tilt direction, and the zoom direction.

The CPU 411 changes an image-capturing direction or a zoom magnification in response to a control command received from the image processing apparatus 100 via the communication processing unit 406. Upon reception of the control command that designates the center position and the zoom magnification from the NW camera 110, the CPU 411, in response to the control command, controls panning and tilting to set a designated position at the center of image-capturing and controls zooming to set the designated zoom magnification.

<Reading>

Figure 5:
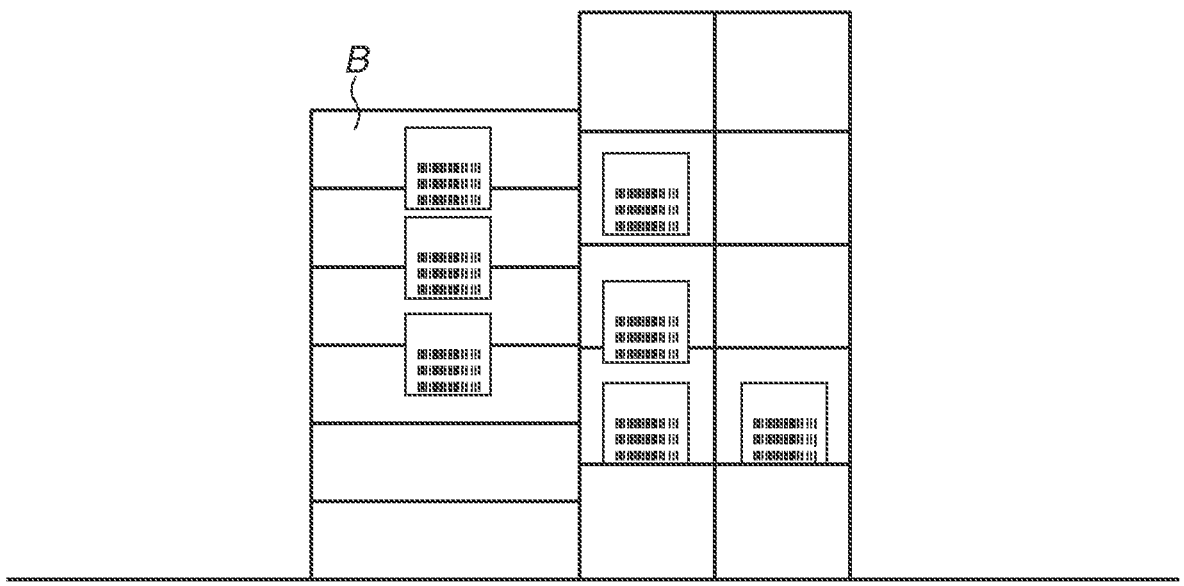
FIG. 5 is a diagram illustrating a loaded packages.

FIG. 5 is a diagram illustrating loaded packages as a processing target. In the present exemplary embodiment, loaded packages B, on which tags are not arranged regularly, serves as a processing target as illustrated in FIG. 5. The image processing apparatus 100 performs matching processing using a tag model image for the overall image obtained by capturing an image of the entire loaded packages to detect areas in each of which the tag model image appears, and determines a range to capture a zoom-in image based on the result of the detection.

<Preparation Processing>

Figure 6:
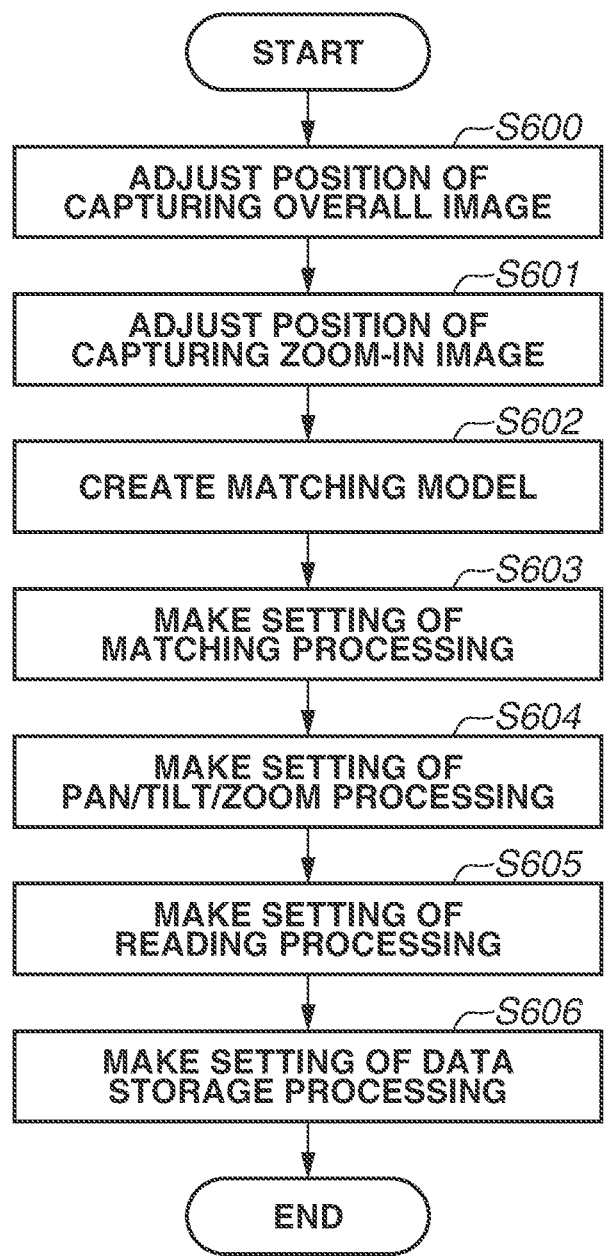
FIG. 6 is a flowchart illustrating a procedure of preparation processing.

FIG. 6 is a flowchart illustrating preparation processing performed by the image processing apparatus 100.

In step S600, the CPU 201 adjusts a position of capturing an image of the entire loaded packages (position of capturing the overall image) in response to the user's operation. The user adjusts panning, tilting, and zooming while seeing an image of the loaded packages displayed on the display 204 so that the entire loaded packages fall within an image-capturing range. The CPU 201 generates a control command based on a setting of the panning, tilting, and zooming adjusted based on the user's operation, and transmits the control command to the NW camera 110. The NW camera 110 receives the control command from the image processing apparatus 100, performs panning, tilting, and zooming based on a setting indicated by the control command to perform image-capturing processing, acquires the overall image, and transmits the overall image to the image processing apparatus 100. The CPU 201 performs control to display the received overall image on the display 204.

Next, in step S601, the CPU 201 designates a position of a tag area in the overall image. More specifically, the user performs an operation to find the tag area in the overall image and designate the position while seeing the overall image displayed on the display 204. The CPU 201 designates the position of the tag area in the overall image in response to the user's operation. The designated position of the tag area serves as a position of capturing a zoom-in image.

Figure 7:
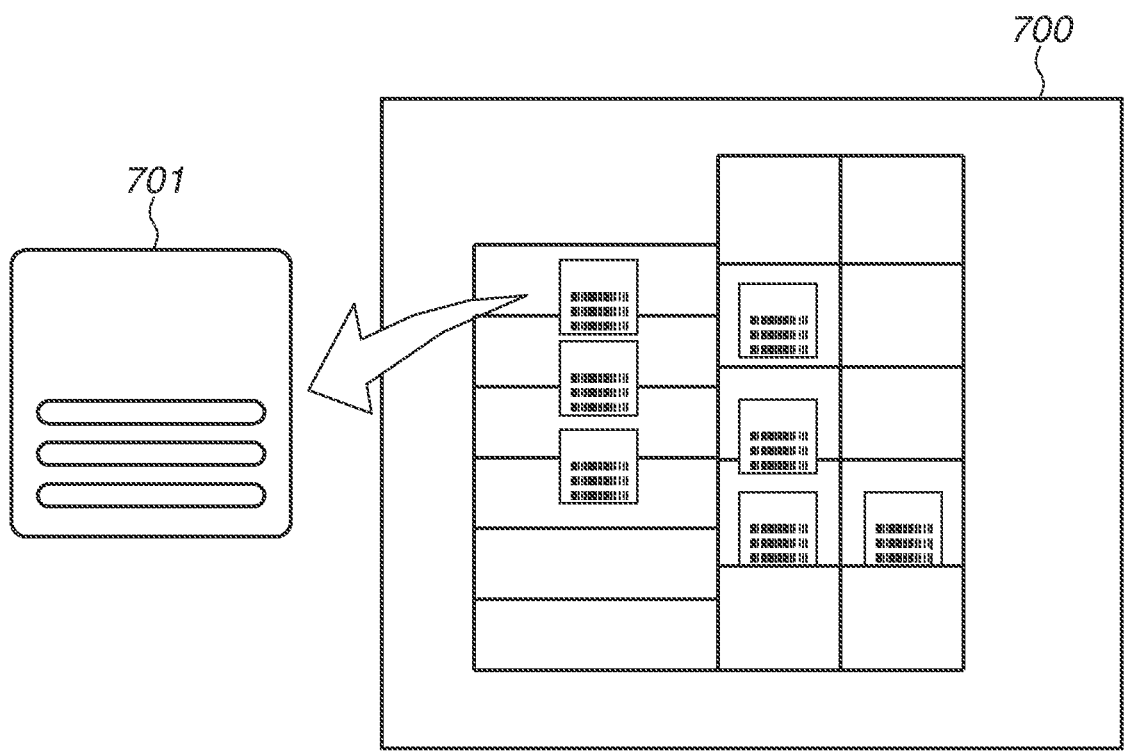
FIG. 7 is a diagram illustrating a matching model.

Next, in step S602, the CPU 201 creates a matching model (model image). More specifically, the CPU 201 extracts a tag image from an overall image 700 illustrated in FIG. 7 based on the position designated in step S601, and sets the tag image as a matching model 701 for a tag image.

Figure 8:
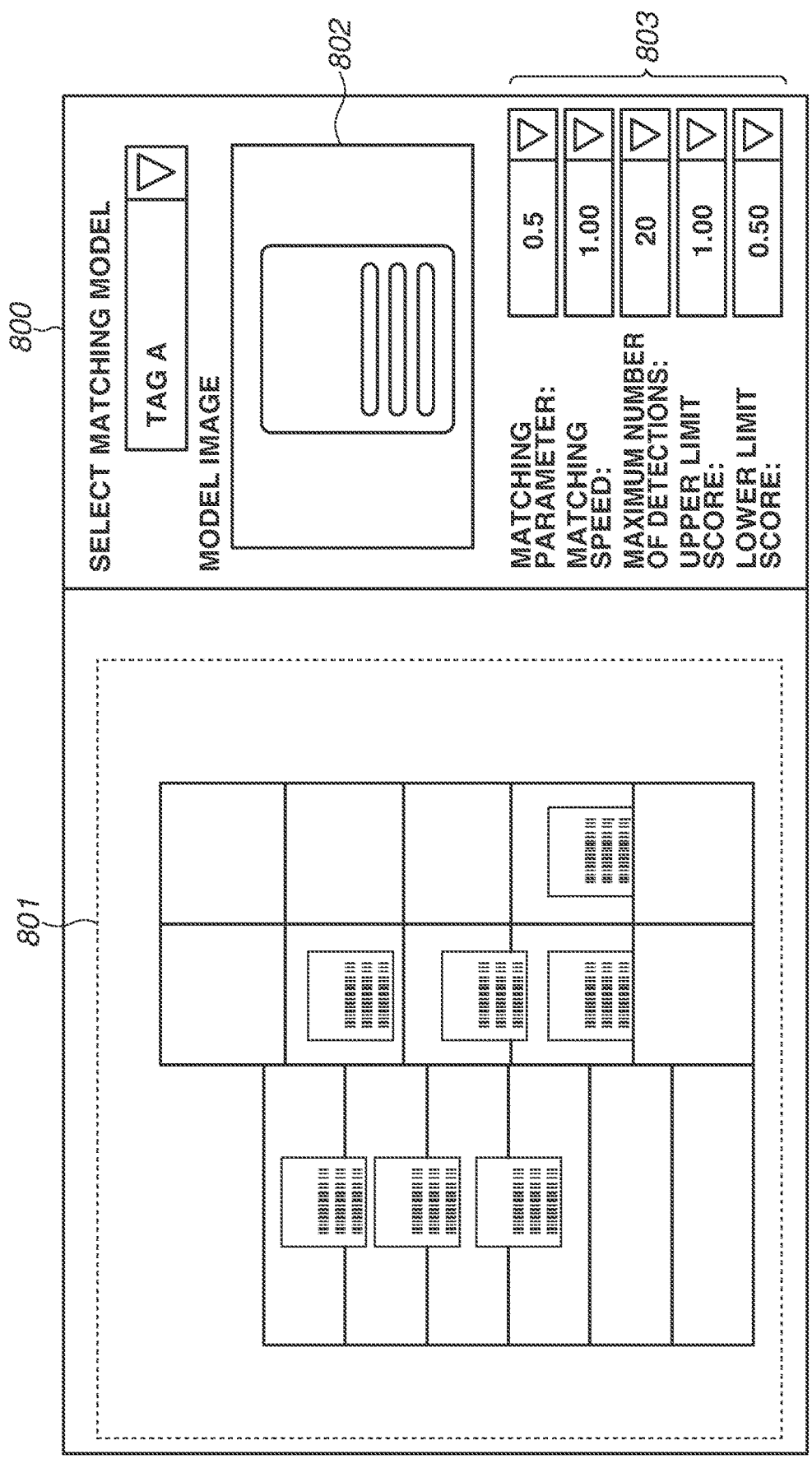
FIG. 8 is a diagram illustrating an example of a setting screen.

Next, in step S603, the CPU 201 makes a setting of the matching processing. More specifically, the CPU 201 sets a target area of the matching processing based on a frame 801 set by the user on a setting screen 800 illustrated in FIG. 8. The CPU 201 also sets the matching model in response to the user's operation. Setting the matching model at this time is to designate a matching model image to use the matching model created in step S602 as a reference image for the matching processing performed in step S603. The set matching model is displayed in an area 802. The CPU 201 further sets a matching parameter in response to an input to an area 803. The CPU 201 also determines execution order of the matching processing. For example, the CPU 201 makes a setting of performing the matching processing in ascending/descending order of an X-coordinate or a Y-coordinate.

Figure 9:
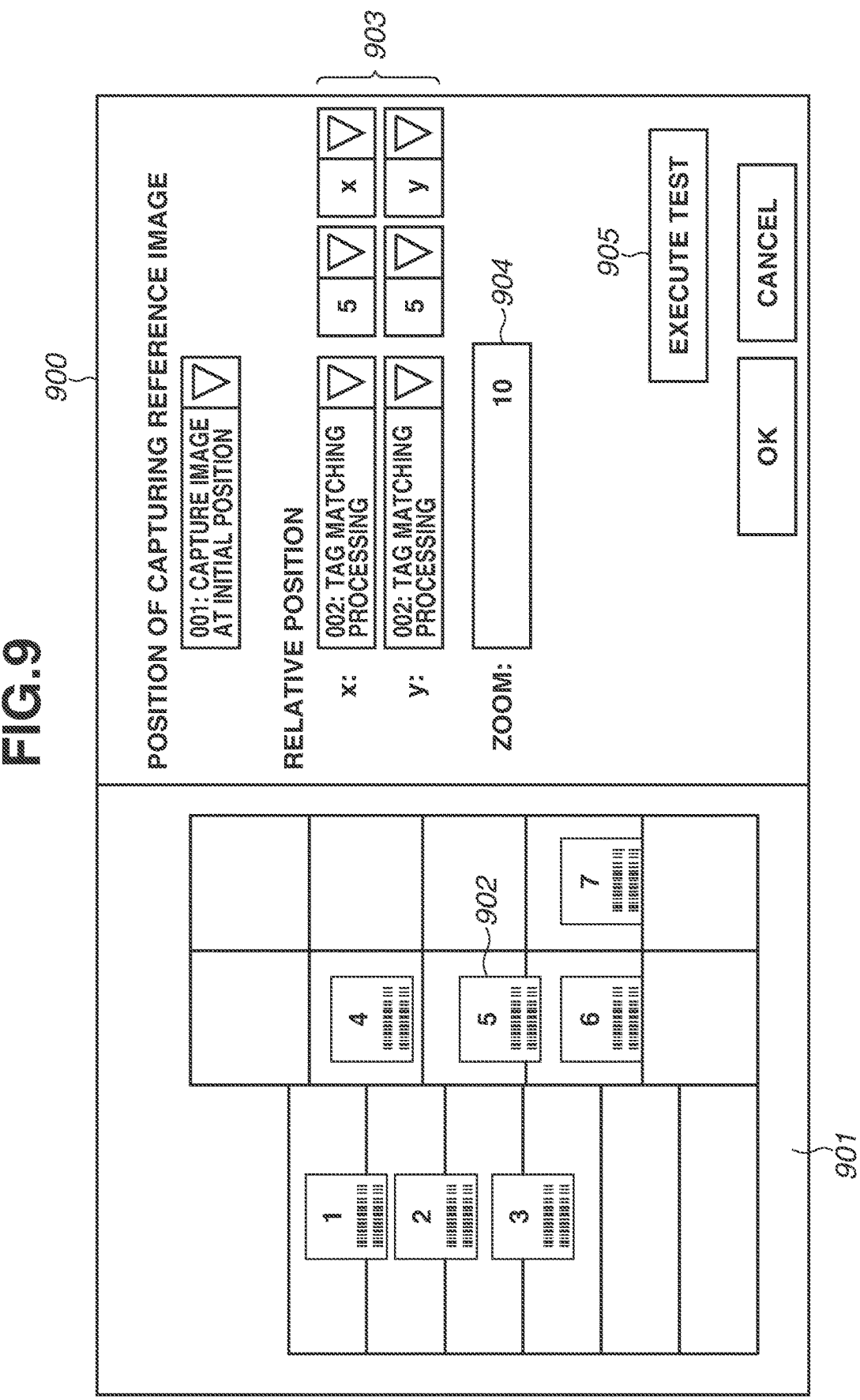
FIG. 9 is a diagram illustrating an example of a test screen.

When performing the matching processing, the CPU 201 displays a test screen 900 illustrated in FIG. 9 on the display 204. The overall image is displayed in an area 901 of the test screen 900, and a frame 902 indicating a result of the matching for each area in which the matching model has appeared is superimposed on the overall image. FIG. 9 indicates that all of tag areas 1 to 7 match with the matching model, and the detection has succeeded. If the user refers to the result of the matching and finds any tag area in which the detection has failed, the user can adjust accuracy of the matching processing by re-designating the position of capturing a zoom-in image in an area 903 and/or resetting the zoom magnification on an area 904. At least one of the tag areas detected in the matching processing is set as a position of capturing a zoom-in image for test.

Next, in step S604, if an execute test button 905 is pressed in a state where the position of capturing a zoom-in image and the zoom magnification are set on the test screen 900, the CPU 201 creates a control command based on the setting and transmits the control command to the NW camera 110. The NW camera 110 receives the control command from the image processing apparatus 100, performs panning, tilting, and zooming (PTZ) based on a setting indicated by the control command to perform image-capturing processing, acquires a zoom-in image, and transmits the zoom-in image to the image processing apparatus 100. The CPU 201 then displays in the area 901 the received zoom-in image. The user can check whether images of barcodes are appropriately captured in the zoom-in image, and adjust the zoom magnification.

Next, in step S605, the CPU 201 further makes a setting of reading. The CPU 201 makes settings of a rectangular area to be a target for reading a barcode, a type of a barcode, the number of barcodes, a dictionary, and the like.

Next, in step S606, the CPU 201 makes a setting to store information read in reading processing, which will be described below. More specifically, as illustrated in FIG. 10, the CPU 201 creates a storage area to store data.

<Overall Processing>

Figure 11:
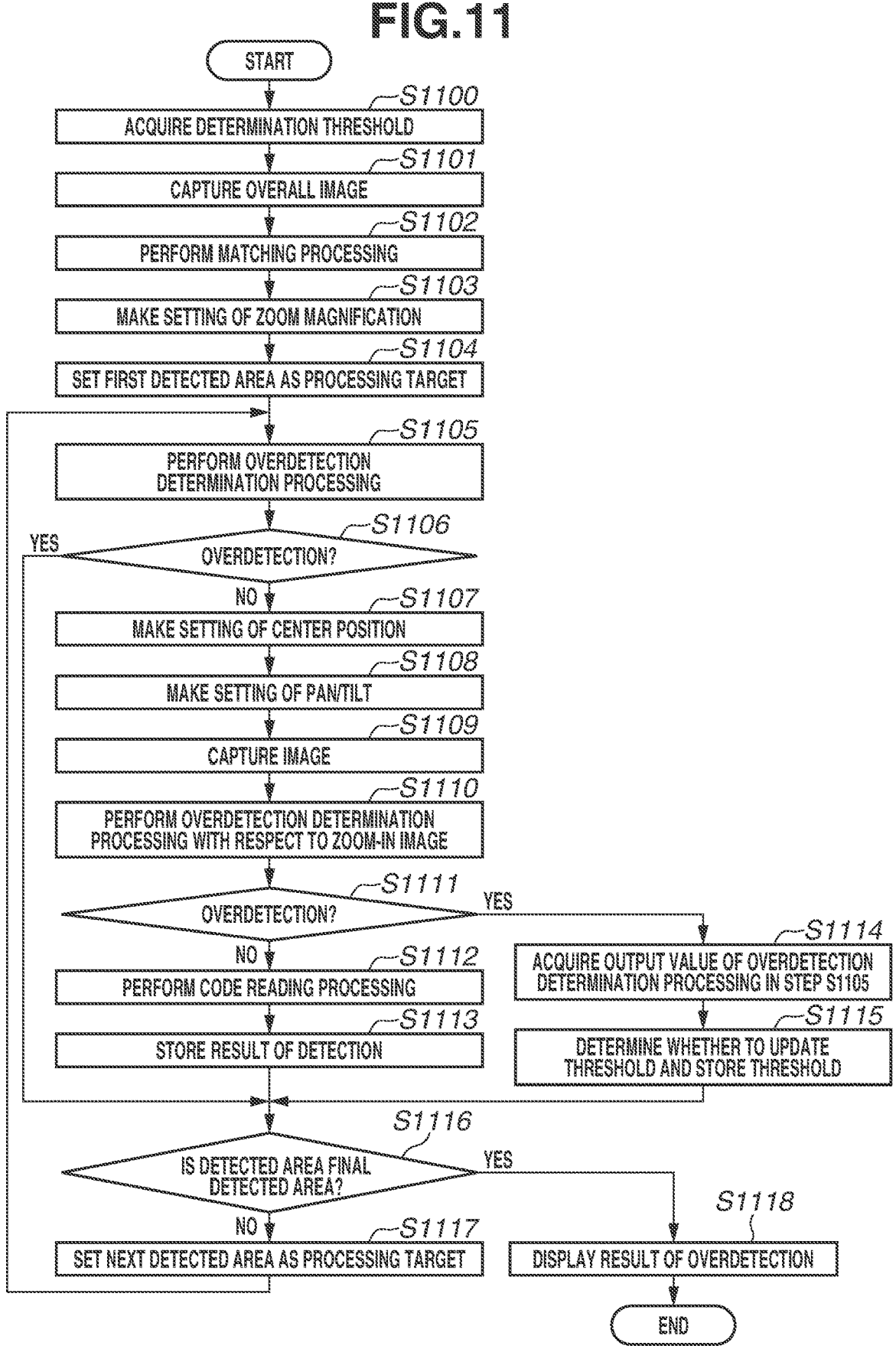
FIG. 11 is a flowchart illustrating a procedure of overall processing according to a first exemplary embodiment.

FIG. 11 is a flowchart illustrating overall processing according to the first exemplary embodiment.

In step S1100, the CPU 201 acquires a determination threshold from the HDD 205. The determination threshold is a value stored in step S1115, which will be described below, in the previous overall processing. Details of the determination threshold will be described below. The determination threshold is stored in the HDD 205. The HDD 205 corresponds to a storage unit.

Next, a description will be given of overdetection. In the present exemplary embodiment, the CPU 201 detects the areas in which the model image appears by the matching processing using the tag model image from the captured overall image of the loaded packages to which the plurality of tags is attached, as illustrated in FIG. 5. At this time, a tag that has not been detected is not subjected to the reading processing. For this reason, the number of undetected tags is to be reduced to zero. Thus, in the present exemplary embodiment, setting a low threshold for the matching parameter in the setting of the matching processing in step S603 (in FIG. 6) prevents the tags from being undetected even if detection becomes more or less excessive detection. In this manner, a setting to detect the number of areas more or less excessively than the actual number of tags is referred to as an "overdetection setting". In addition, the number of areas that include no tag is referred to as "the number of overdetected areas". Furthermore, the number of areas that include tags but have not been detected is referred to as "the number of undetected areas".

Figure 12A:
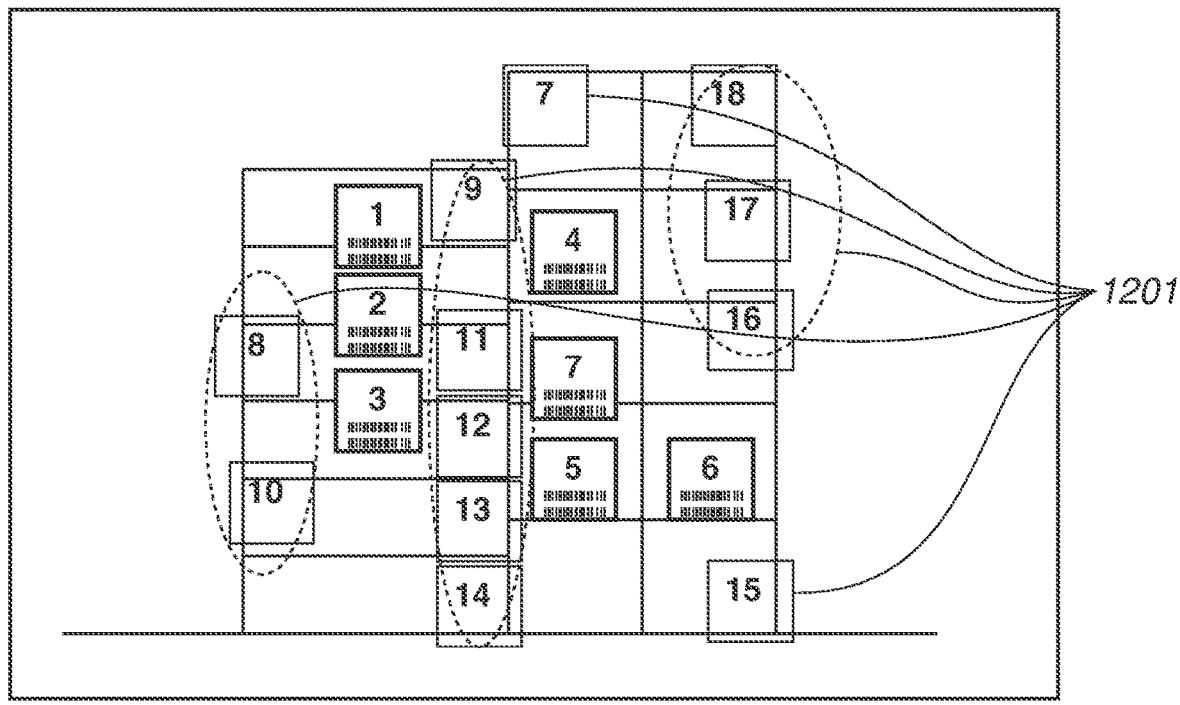
FIGS. 12A and 12B are diagrams illustrating overdetection.
Figure 12B:
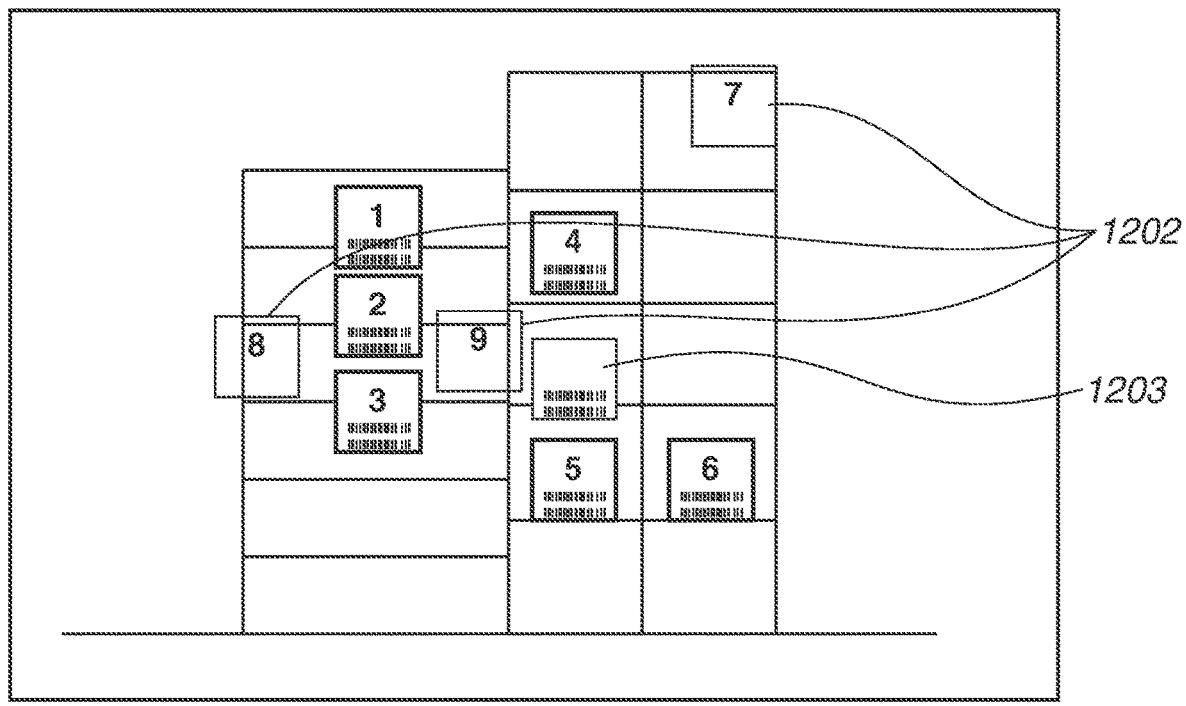

FIGS. 12A and 12B are diagrams illustrating overdetection. FIG. 12A illustrates a case where the number of overdetected areas is large but the number of undetected areas is zero. While all of portions 1 to 7 that include tags have been detected in FIG. 12A, portions 8 to 18 that include no tag in areas 1201 have been detected. In this case, the number of overdetected areas is large (the number of targets for subsequent processing is large), thereby increasing the overall processing time. However, since the present system is required to make the number of undetected areas to be zero, the present case is a suitable case. On the other hand, FIG. 12B illustrates a case where the number of overdetected areas is small, but the number of undetected areas is not zero. In FIG. 12B, portions 7 to 9 that include no tag in areas 1202 have been detected and the number of overdetected areas is smaller than that in the case of FIG. 12A, but there is an undetected tag in an area 1203. In the present system, an appropriate threshold for the matching parameter to make the number of overdetected areas as small as possible in such a case as illustrated in FIG. 12A without being the case as illustrated in FIG. 12B.

The description goes back to the flowchart in FIG. 11.

In step S1101, the CPU 201 generates a control command under the conditions set in step in S600 (in FIG. 6), and transmits the control command to the NW camera 110. The NW camera 110 receives the control command from the image processing apparatus 100, performs panning, tilting, and zooming based on a setting indicated by the control command to perform image-capturing processing, acquires an image, and transmits the image to the image processing apparatus 100.

In step S1102, the CPU 201 performs the matching processing based on the information set in step S603 (in FIG. 6) for the overall image received in step S1101, and detects areas in which the tag model image appears. In the present exemplary embodiment, since the matching processing is set as the overdetection setting described above, the larger number areas than the number of tags that actually exist in the overall image are detected. The areas detected in step S1102 are hereinbelow referred to as detected areas. In step S1102, the CPU 201 functions as a detection unit.

In step S1103, the CPU 201 makes a setting of the zoom magnification set in step S604 (in FIG. 6).

In step S1104, the CPU 201 sets a first detected area out of the detected areas detected in step S1102 as a processing target.

In step S1105, the CPU 201 performs overdetection determination processing for the detected area set as the processing target. The overdetection determination processing executed in step S1105 is hereinbelow referred to as first determination processing.

<Preparation Processing to Perform First Determination Processing>

First, a description will be given of preparation processing to perform the first determination processing.

Figure 13:
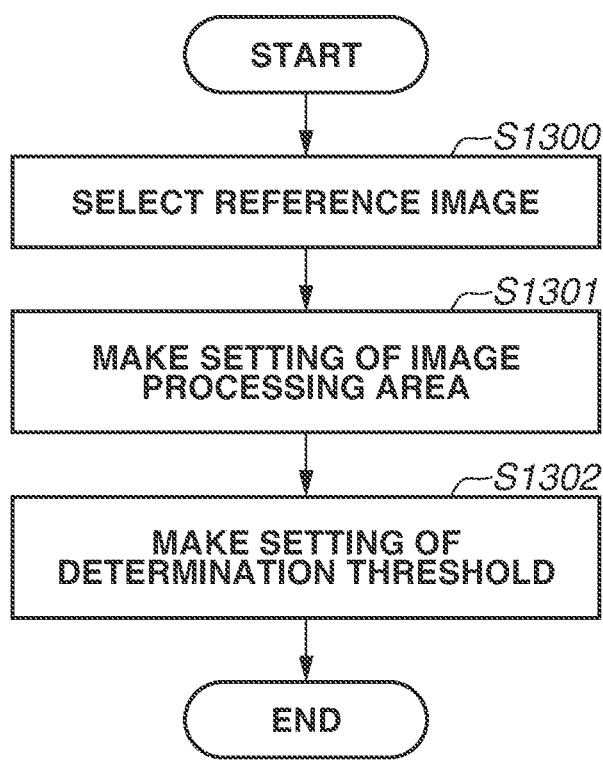
FIG. 13 is a flowchart illustrating a procedure of preparation processing.
Figure 14A:
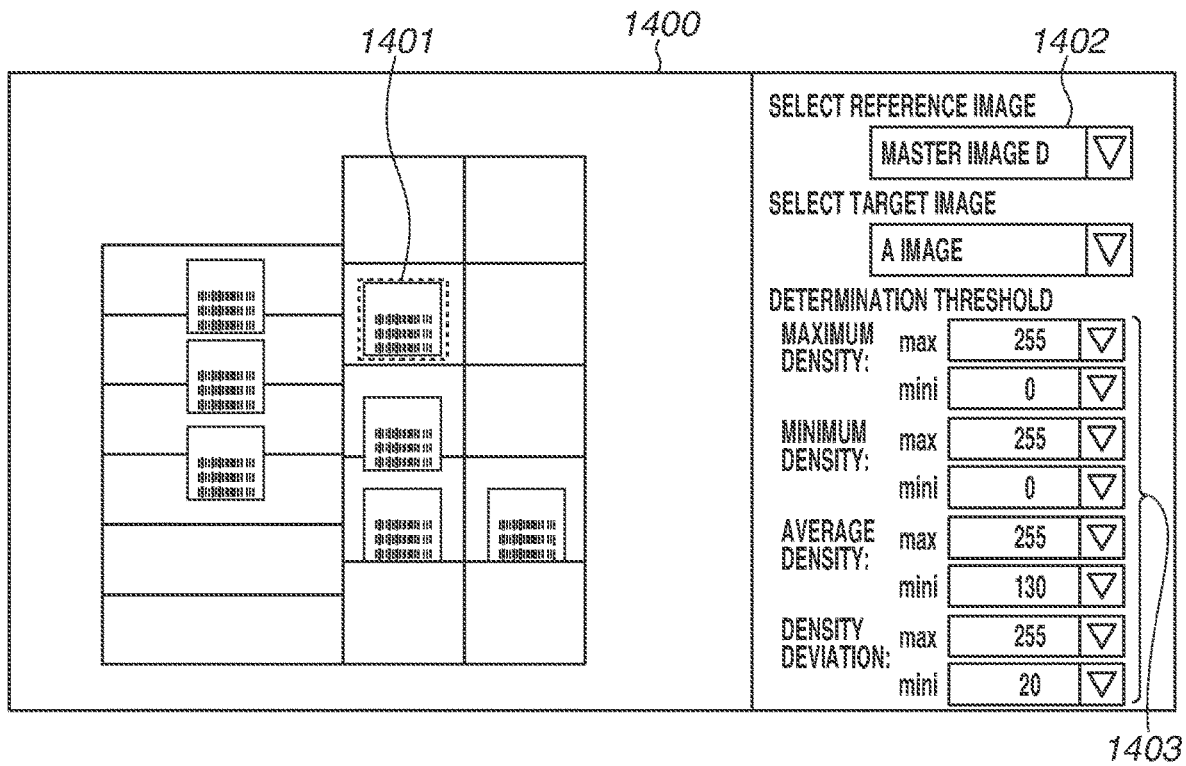
FIGS. 14A and 14B are diagrams each illustrating an example of a setting screen.
Figure 14B:
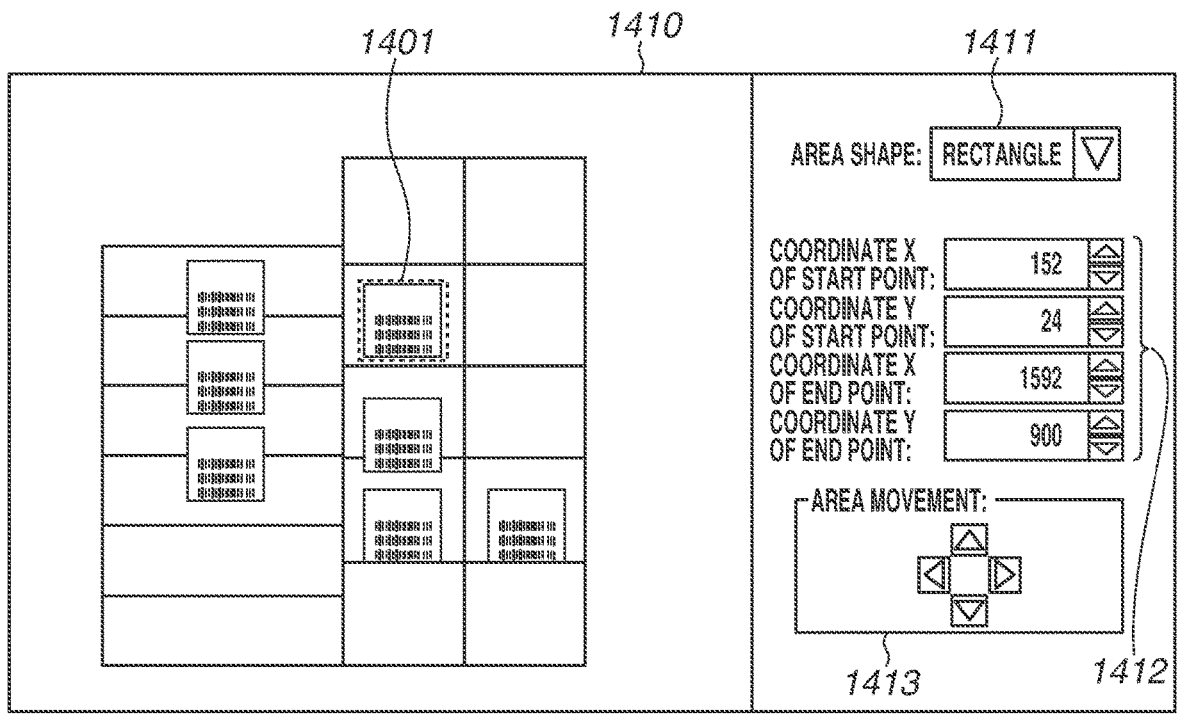

FIG. 13 is a flowchart illustrating preparation processing to perform the first determination processing. FIG. 14A illustrates a setting screen 1400 to set a determination threshold. FIG. 14B illustrates a setting screen 1410 to set an image processing area.

In the flowchart illustrated in FIG. 13, the CPU 201 makes a setting so as to determine whether the detected area detected in step S1102 in FIG. 11 is a tag area. In the present exemplary embodiment, the CPU 201 makes the setting so as to determine whether the detected area is the tag area based on presence or absence of the feature of a barcode image. For example, the CPU 201 designates the tag area in the overall image as the image processing area, and performs image processing on the image processing area. The CPU 201 then makes a setting of a threshold serving as a reference for determination so as to determine the presence/absence of the feature of the barcode image for an average density obtained by image processing and an image feature quantity such as a standard deviation of density. The threshold of the image feature quantity serving as the reference for determination is hereinbelow referred to as a determination threshold. The determination threshold corresponds to a determination reference value.

In steps S1300 and S1301, the CPU 201 selects a reference image and makes a setting of the image processing area. More specifically, the CPU 201 selects an overall image (reference image) serving as a reference for setting the determination threshold in an area 1402 of the setting screen 1400 illustrated in FIG. 14A. As for the setting of the image processing area, the CPU 201 selects the shape of a designated frame 1401 in an area 1411 of the setting screen 1410 illustrated in FIG. 14B, displays the designated frame 1401 having the designated shape on the reference image, and makes the setting of the image processing area based on the position and size of the designated frame 1401. More specifically, the user designates the size of the designated frame 1401 with a mouse as the input device 206 to match with the tag area and operates an arrow icon in an area 1413 to designate the position of the designated frame 1401. Alternatively, the user directly inputs coordinate values in coordinates X and Y of the start point and coordinates X and Y of the end point in an area 1412, and designates the position and size of the designated frame 1401 to match with the tag area.

Subsequently, in step S1302, the CPU 201 makes a setting of the determination threshold. Specifically, the CPU 201 sets an upper limit value (max)/lower limit value (mini) of the determination threshold corresponding to the input to an area 1403 illustrated in FIG. 14A regarding the average density and density deviation (standard deviation of density) of the image processing area set in step S1301 described above. For example, in a case where the average density of a barcode supposed to have at least is 130, the upper limit value of the average density is set at 255, and the lower limit value of the average density is set at 130. In addition, in a case where the density deviation of the barcode supposed to have at least is 20, the upper limit value of the density deviation is set at 255, and the lower limit value of the density deviation is set at 20. Further, a maximum density of the barcode supposed to have at least and a minimum density of the barcode supposed to have at most are also set in a similar manner.

In the present exemplary embodiment, the average density and the density deviation are used as the determination threshold. Meanwhile, a feature quantity regarding a color of the image, if only it is image information that can be obtained by performing the image processing, may be used together with the feature quantity regarding the density of the image such as the average density and the density deviation, or in substitution for the feature quantity regarding the density of the image.

The description returns to the flowchart in FIG. 11.

In step S1105, the CPU 201 performs the first determination processing on the detected area set as the processing target. More specifically, the CPU 201 determines whether each of the average density and the density deviation described above for the image processing area set in step S1301 (in FIG. 13) out of the detected areas in the overall image is within a range of the determination threshold set in step S1302 (in FIG. 13). As for the detected area determined within the range of the determination threshold, the CPU 201 executes overdetection determination processing for a zoom-in image (in step S1110) on a zoom-in image obtained by capturing a zoom-in image of the detected area on the detected area, and determines whether the zoom-in image is the barcode image. Thus, even if the CPU 201 determines that each of the average density and the density deviation is within the range of the determination threshold in step S1105, the area is not fixed as the area including the barcode. In other words, determining that each of the average density and the density deviation is within the range defined by the determination threshold in step S1105 means that determining that the detected area is a candidate for the area including the barcode (i.e., is not the overdetected area). On the other hand, determining that each of the average density and the density deviation is outside the range defined by the determination threshold means that determining that the detected area is not the area including the barcode (i.e., is the overdetected area). The CPU 201 causes the RAM 203 to hold the average density and the density deviation of the detected area used for the first determination processing. The average density and the density deviation held in the RAM 203 are updated every time the first determination processing is executed.

In step S1106, the CPU 201 determines whether the detected area set as the processing target is the overdetected area. In a case where the CPU 201 determines that the detected area is the overdetected area (i.e., is not the area including the barcode) (YES in step S1106), the processing proceeds to step S1116. The detected area determined as the overdetected area is excluded from a target for capturing the zoom-in image and a target for performing the reading processing. This can reduce the overall processing time. On the other hand, in a case where the CPU 201 determines that the detected area is not the overdetected area (i.e., is the candidate for the area including the barcode) (NO in step S1106), the processing proceeds to step S1107. In this way, the CPU 201 functions as a first determination unit in steps S1105 and S1106.

Subsequently, in step S1107, the CPU 201 sets the position of the detected area set as the processing target, as a center position of capturing a zoom-in image.

In step S1108, the CPU 201 generates a control command to cause the NW camera 110 to adjust panning, tilting, and zooming based on the zoom magnification set in step S1103 and the center position of taking the zoom-in image set in step S1107, and transmits the control command to the NW camera 110. The NW camera 110 receives the control command from the image processing apparatus 100, and makes a setting of panning, tilting, and zooming based on a setting indicated by the control command. In addition, the setting of the zoom magnification is made on the first detected area, but not on the second and subsequent detected areas. Thus, the NW camera 110 performs adjustment of panning and tilting on the second or subsequent detected areas. In steps S1107 and S1108, the CPU 201 functions as an imaging control unit.

In step S1109, the NW camera 110 performs image-capturing processing after performing panning, tilting, and zooming following the setting made in step S1108, acquires a zoom-in image, and transmits the zoom-in image to the image processing apparatus 100. The CPU 201 receives the zoom-in image from the NW camera 110. In step S1109, the CPU 201 functions as a reception unit.

Figure 15A:
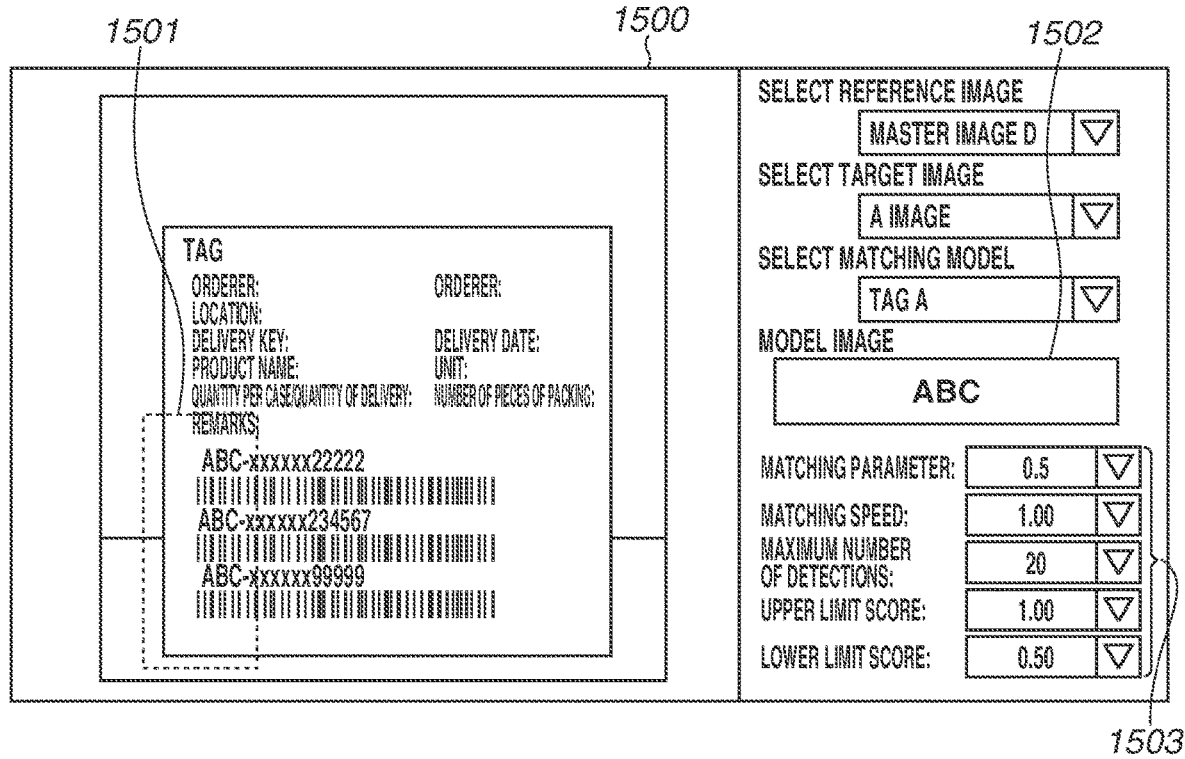
FIGS. 15A and 15B are diagrams each illustrating an example of a setting screen.
Figure 15B:
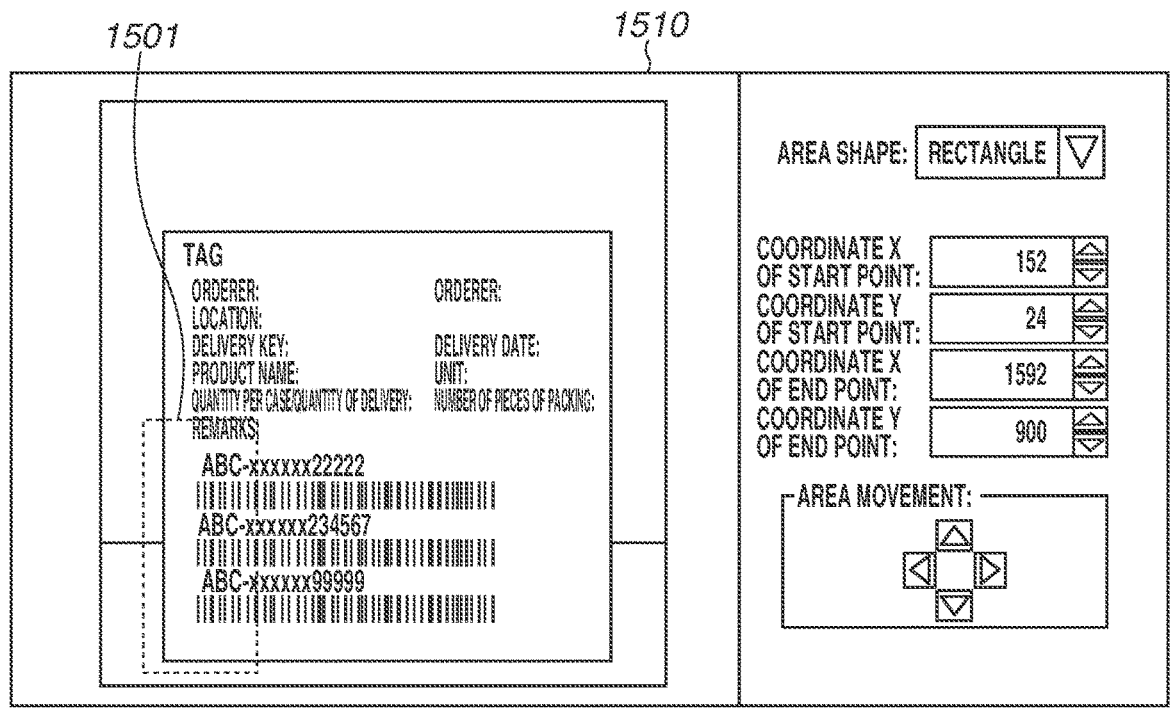

In step S1110, the CPU 201 performs the overdetection determination processing for the zoom-in image received in step S1109. The overdetection determination processing executed in step S1110 is hereinafter referred to as second determination processing. More specifically, the CPU 201 first executes preparation processing to perform the second determination processing similar to the processing illustrated in the flowchart described with reference to FIG. 13 and makes various kinds of settings. FIG. 15A illustrates a setting screen 1500, which is similar to the setting screen 1400 illustrated in FIG. 14A, to set a threshold used for determination. FIG. 15B illustrates a setting screen 1510, which is similar to the screen illustrated in FIG. 14B, to set an image processing area. The CPU 201 determines whether the zoom-in image is the barcode image (i.e., is not the overdetected area) or not the barcode image (i.e., is the overdetected area), based on the various setting values set in the preparation processing. For example, similar to the first determination processing, the CPU 201 determines whether the zoom-in image is the barcode image based on the threshold for the image feature quantity of the set image processing area.

In the second determination processing, since the image of a target for determination is the zoom-in image, a resolution at which an image of the object is captured is high. Thus, character recognition processing, shape matching processing, or the like may be used as a means for determining the overdetection. For example, in FIG. 15A, the CPU 201 makes a setting of a model image indicating predetermined characters ("ABC" in the example of FIG. 15A) in an area 1502, and makes a setting of a matching parameter based on the input to an area 1503. In this case, as the second determination processing, the CPU 201 performs matching processing on an image processing area set by a designated frame 1501 in the zoom-in image in accordance with set information and determines whether the predetermined characters appear.

In step S1111, the CPU 201 determines whether the zoom-in image received in step S1109 is an image of the overdetected area. In a case where the CPU 201 determines that the zoom-in image is the image of the overdetected area (YES in step S1111), the processing proceeds to step S1114. On the other hand, in a case where the CPU 201 determines that the zoom-in image is not the image of the overdetected area (NO in step S1111), the processing proceeds to step S1112. In steps S1110 and S1111, the CPU 201 functions as a second determination unit.

In the case where the CPU 201 determines that the zoom-in image is the image of the overdetected area (i.e., is not the barcode image) as a result of the determination processing (YES in step S1111), the processing proceeds to step S1114.

In step S1114, the CPU 201 identifies an area in the overall image captured in step S1101 and corresponding to the zoom-in image received in step S1109. The identified area at this time is the detected area subjected to the first determination processing. Further, the CPU 201 acquires the average density and the density deviation used in the first determination processing performed on the identified area. The values are in the state of being held in the RAM 203 as the latest values output in the processing in step S1105 described above, and thus can be acquired easily.

Subsequently, in step S1115, the CPU 201 updates, based on the average density and the density deviation acquired in step S1114, the determination thresholds used in the first determination processing, and stores the determination thresholds in the HDD 205. More specifically, in this execution flow, initial values of the determination thresholds are set in such a manner that the upper limit value of the average density is set at 255, the lower limit value of the average density is set at 130, the upper limit value of the density deviation is set at 255, and the lower limit value of the density deviation is set at 20, as described above. In this setting state, assume that the average density is 128 and the density deviation is 19 as image feature quantities acquired in step S1114. In this case, the CPU 201 updates the lower limit value of the average density to 128, and updates the lower limit value of the density deviation to 19. In addition, assume that the average density is 129 and the density deviation is 18 as image feature quantities acquired in step S1114 in the processing subsequently executed. In this case, in step S1115, the CPU 201 keeps the average density as 128, which is currently stored (does not update the average density with the present value). On the other hand, the CPU 201 updates the density deviation of 19, which is currently stored, with 18. In this way, changing an allowable range of the determination threshold for the first determination processing causes more detected areas to be determined as the overdetected areas (i.e., not the areas including barcodes) in the first determination processing.

However, if the allowable range of the determination threshold to determine the detected areas as the overdetected areas is made too wide in step S1105, there is a possibility that an undetected area may occur as described above. To avoid such a case, the CPU 201 may set a change limitation value to the upper limit value/lower limit value of the determination threshold of the first determination processing to prevent the threshold from becoming a certain value or greater (or less). More specifically, the CPU 201 updates the determination threshold if each of the average density and the density deviation acquired in step S1114 is within the range defined by the change limitation value set to the upper limit value/lower limit value of the determination threshold. The CPU 201 does not update the determination threshold if each of the average density and the density deviation is outside the range defined by the change limitation value set to the upper limit value/lower limit value of the determination threshold. After completion of the processing in step S1115, the processing proceeds to step S1116. In steps S1114 and S1115, the CPU 201 functions as an update control unit.

In step S1116, the CPU 201 determines whether the detected area subjected to the first determination processing is a final detected area in order of detection in step S1102. In a case where the CPU 201 determines that the detected area is the final detected area (YES in step S1116), the processing proceeds step S1118. In a case where the CPU 201 determines that the detected area is not the final detected area (NO in step S1116), the processing proceeds to step S1117.

In step S1117, the CPU 201 sets the next detected area as a processing target. Thereafter, the processing returns to step S1105. In this manner, the first determination processing is sequentially executed on a plurality of detected areas. While the center position of capturing a zoom-in image is changed in step S1107 and the panning and tilting is adjusted anew to capture an image in step S1108, the NW camera 110 does not perform such an operation as to zoom out once and then zoom in anew. This can reduce processing time required for the zoom driving of the NW camera 110.

In step S1118, the CPU 201 displays, on the display 204, results of the first determination processing and second determination processing in association with the respective positions of the detected areas detected in step S1102 in the overall image captured in step S1101. A detailed description will be given below with reference to FIG. 18A. In addition, the CPU 201 displays a display item indicating that the threshold is updated in step S1115 on the display 204. A detailed description will be given below with reference to FIG. 18B. In addition, the notification method only is to be a method of making notification that the threshold is updated, and notification may be made with a method other than a display method. In step S1118, the CPU 201 functions as a display control unit and a notification unit. Upon completion of the processing in step S1118, a sequence of the procedure of the overall processing described above ends.

Next, a description will be given of a case where the zoom-in image is not the image of the overdetected area (i.e., is the barcode image) as a result of the determination processing in step S1111.

In step S1112, the CPU 201 performs code reading processing in accordance with the information set in step S605 (in FIG. 6) on the zoom-in image received from the NW camera 110 in step S1109. Subsequently, in step S1113, the CPU 201 stores read information obtained as a result of the code reading processing performed in accordance with the information set in step S606 (in FIG. 6) in a storage unit such as the HDD 205. After completion of the processing in step S1113, the processing proceeds to step S1116. In steps S1112 and S1113, the CPU 201 functions as a reading unit.

In addition, in a case where a failure of the code reading processing in step S1112 is due to accuracy in panning and tilting control of the NW camera 110 in the panning and tilting setting made in step S1108, the CPU 201 may make the setting of the zoom magnification, perform the matching processing, and make the setting of panning and tilting in a stepwise manner More specifically, the CPU 201 makes the setting for the zoom magnification in step S1103 lower than the setting for the zoom magnification that enables the code reading processing in step S1112, and performs the matching processing again using the tag model image after capturing a zoom-in image in step S1109.

As a result of performing the matching processing again, the CPU 201 makes the setting of the center position of a detected area with coordinates being close to those of the center of the screen, makes the setting of panning and tilting, captures a zoom-in image, and performs the code reading processing.

FIG. 16 illustrates an example of a captured image screen displayed on the display 204 at the time of capturing the zoom-in image (in step S1109). The overall image captured in step S1101 is displayed in an area 1601, and a frame 1602 indicating a result of the matching processing in step S1102 is superimposed on the overall image. In addition, the zoom-in image is displayed in an area 1603. FIG. 16 illustrates an example in which a zoom-in image of the fifth detected area in order of detection in step S1102 is displayed.

Figure 17:
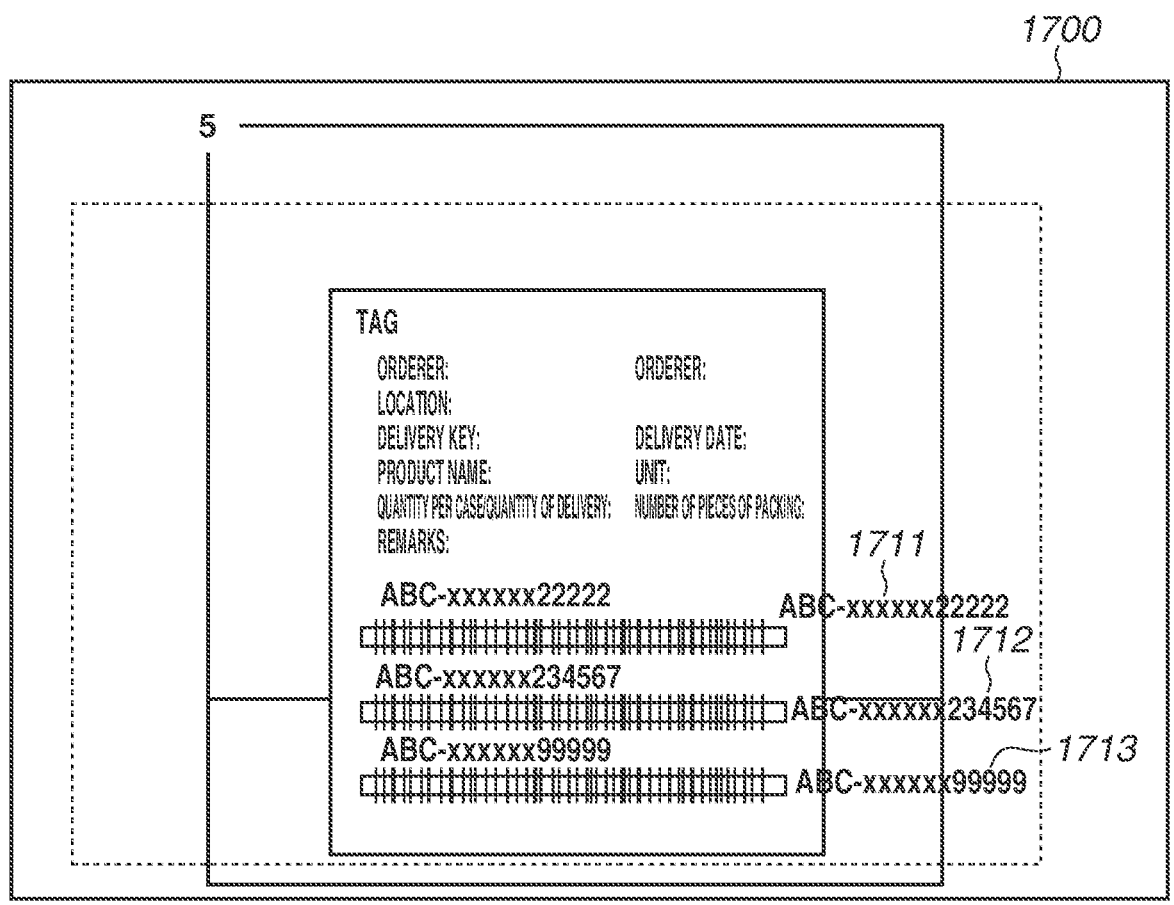
FIG. 17 is a diagram illustrating an example of a read-image screen.

FIG. 17 illustrates an example of a read image screen 1700 that is displayed on the display 204 at the time of performing the code reading processing (in step S1112). Results 1711, 1712, and 1713 of the code reading processing are displayed on the read image screen 1700.

Figure 18A:
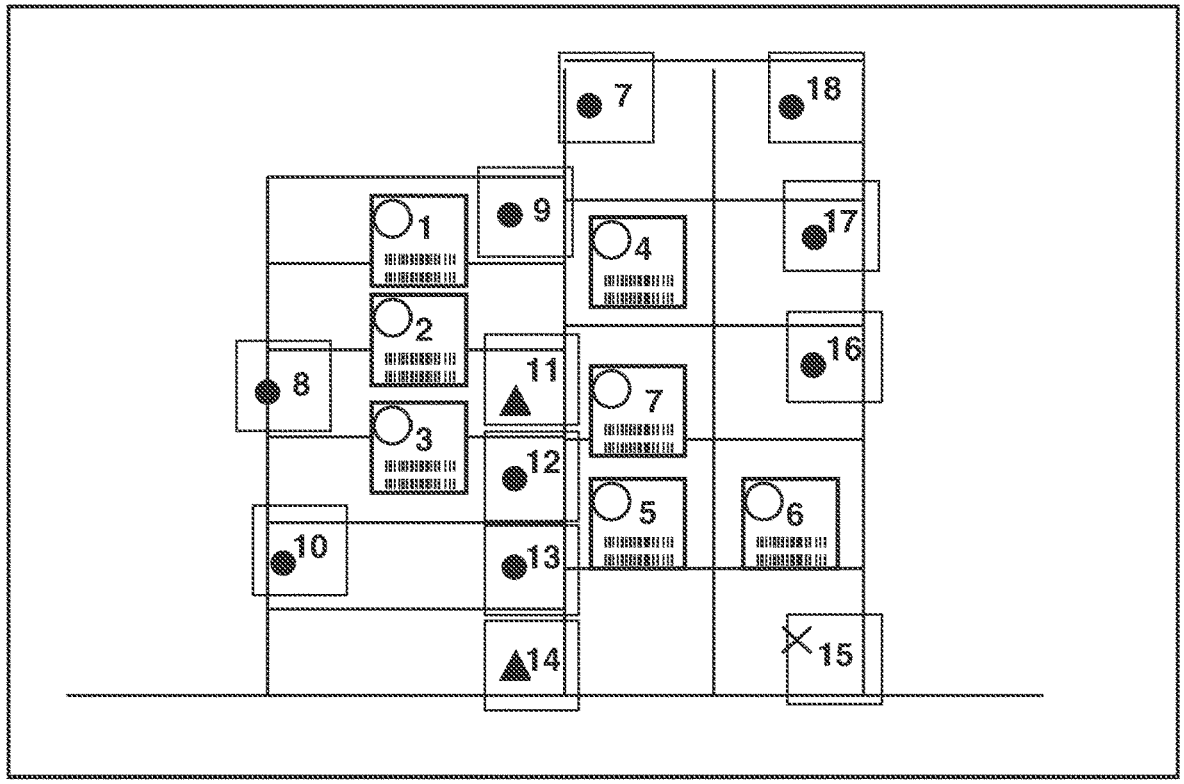
FIGS. 18A and 18B are diagrams each illustrating an example of a display screen.

FIG. 18A illustrates an example of a display screen that displays, on the overall image, a detected area determined as the overdetected area (i.e., not the area including the barcode) in the first determination processing, a detected area corresponding to the zoom-in image determined as the overdetected area (i.e., the image is not the barcode image) in the second determination processing, a detected area corresponding to the zoom-in image with the code reading processing performed normally, and a detected area corresponding to the zoom-in image with the code reading processing failed.

Specifically, a rectangular display frame is displayed in the detected area detected in step S1102, and the order of detection in step S1102 is displayed as a number in the display frame. In addition, a solid circle (●) is displayed as a result of determination in the detected area determined as the overdetected area (i.e., not the area including the barcode) in the first determination processing. A solid triangle (▲) is displayed as a result of determination in the detected area corresponding to the zoom-in image and determined as the overdetected area (i.e., the image is not the barcode image) in the second determination processing. A circle (○) is displayed as a result of determination in the detected area corresponding to the zoom-in image with the code reading processing preformed normally. A cross (x) is displayed as a result of determination in the detected area corresponding to the zoom-in image with the code reading processing failed. In addition, the CPU 201 may perform such display on the display 204 in real time or may store the display image as image data in the HDD 205. While the description has been given on the assumption that the CPU 201 displays results of determination and results of reading in the respective detected areas, the CPU 201 may log the results of determination and the results of reading in the respective detected areas. For example, the CPU 201 may store the results as log data in the HDD 205 by bringing the results in association with the order of detection in step S1102 by classifying the circle (○) as 1 (normal reading), the cross (x) as 99 (abnormal reading), the solid circle (●) as 11 (a result of the first overdetection determination processing is overdetection), and the solid triangle (▲) as 21 (a result of the second overdetection determination is overdetection).

Figure 18B:
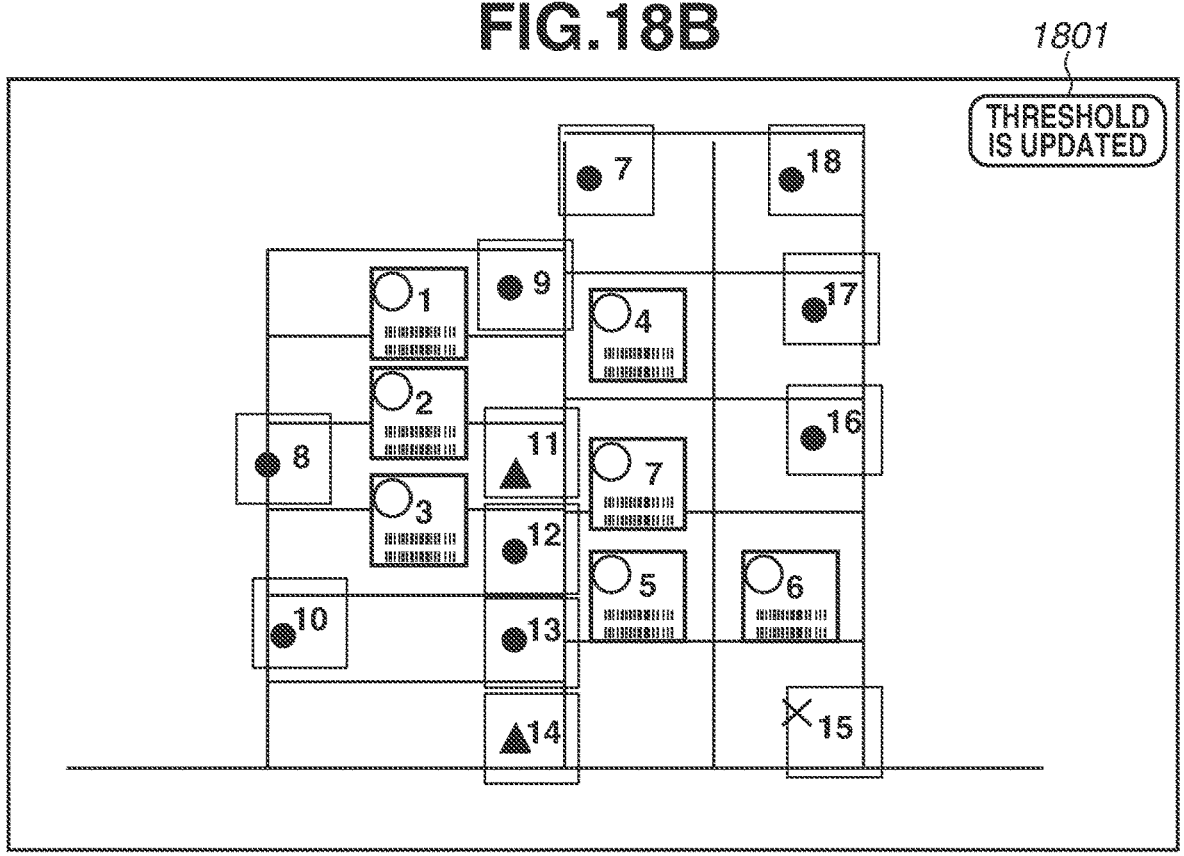

FIG. 18B illustrates an example of a display screen indicating that the threshold is updated in step S1105. More specifically, a display item indicating that the threshold is updated is displayed on an upper right portion of the display 204. A position of displaying the display item may be settable by the user, or may be settable in a unique area by the program. Furthermore, the display item may be a freely-selected mark. In addition, the CPU 201 may store in the HDD 205 such log data as 1 in a case where the threshold is updated and 0 in a case where the threshold is not updated as a result of the overall processing. In addition, the CPU 201 may hide the display item simultaneously when the processing of using the threshold ends or when the overall processing ends.

As described above, in the image processing system according to the first exemplary embodiment, the CPU 201 performs excessive detection on the candidates for the area including the barcode in the overall image so as not to miss an undetected area, and excludes the area not including the barcode from the subsequent processing steps based on the result of determination in the first determination processing. Further, the CPU 201 can update the determination threshold used in the first determination processing based on the result of determination in the second determination processing using the zoom-in image. With this processing, the determination threshold used in the first determination processing can be appropriately set, and a detected area having a feature similar to that of the detected area corresponding to the zoom-in image determined as the overdetected area in the second determination processing can be excluded from the subsequent processing steps in the overall processing of the next time and after. Therefore, the configuration can reduce the overall processing time while preventing an occurrence of an undetected area.

Next, an image processing system according to a second exemplary embodiment will be described with reference to FIG. 19.

In the first exemplary embodiment described above, the first determination processing is executed based on the determination threshold acquired at the beginning of the overall processing. Thus, even if the determination threshold is updated, the determination threshold is not reflected in the first determination processing while the overall processing in FIG. 11 is being executed. Consequently, in a case where a detected area having a feature similar to that of the detected area corresponding to the zoom-in image determined as the overdetected area in the second determination processing appears while the overall processing is being executed, the detected area that appears again is not excluded from the subsequent processing steps. Thus, in the second exemplary embodiment, the CPU 201 acquires the determination threshold after the second determination processing is executed on the previous detected area and before the first determination processing is executed on the next detected area. A hardware configuration of the image processing system according to the second exemplary embodiment is similar to that of the first exemplary embodiment.

Figure 19:
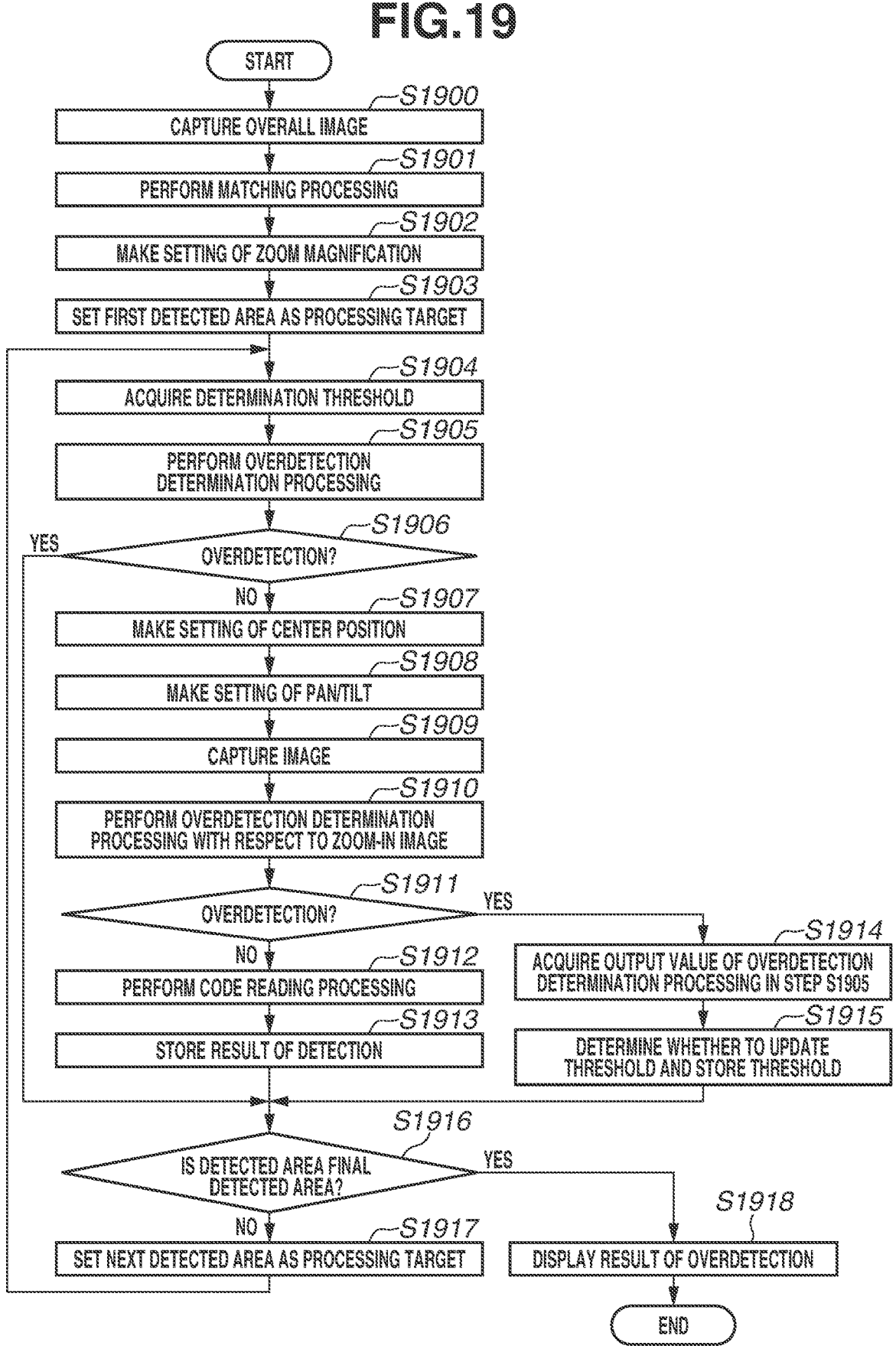
FIG. 19 is a flowchart illustrating a procedure of overall processing according to a second exemplary embodiment.

FIG. 19 is a flowchart illustrating overall processing according to the second exemplary embodiment. The flowchart illustrated in FIG. 19 is different from the flowchart illustrated in FIG. 11 in that the processing in step S1904 corresponding to step S1100 is executed between steps S1903 and S1905 corresponding to steps S1104 and S1105, respectively.

As described above, in the image processing system according to the second exemplary embodiment, the updated determination threshold is reflected in the first determination processing while the overall processing is being executed. Thus, in a case where the detected area having the feature similar to that of the detected area corresponding to the zoom-in image determined as the overdetected area in the second determination processing appears again while the overall processing is being executed, the detected area that appears again can be promptly excluded from the subsequent processing steps. This can reduce the overall processing time.

While the disclosure has been described above in detail with reference to the exemplary embodiments, the disclosure is not limited to the particular exemplary embodiments, and includes various embodiments without departing from the gist of the disclosure. Furthermore, each of the exemplary embodiments described above merely indicates one exemplary embodiment of the disclosure, and can be combined as appropriate.

For example, in each of the exemplary embodiments describe above, the determination threshold used in the first determination processing is updated in a case where the detected area is determined as the overdetected area (not the barcode image) in the second determination processing. In place of the configuration of updating the determination threshold used in the first determination processing depending on the result of determination in the second determination processing in this manner, a configuration of updating the determination threshold used in the first determination processing depending on a result of determination in the code reading processing may be employed. More specifically, the CPU 201 updates the determination threshold used in the first determination processing in a case where a result of the code reading processing indicates a failure. In this case, in the first exemplary embodiment, the processing in steps S1100 and S1111 becomes unnecessary, and in a case where it is determined that the code reading processing has failed after the processing in step S1112, the processing proceeds to step S1114.

The aspect of the embodiments can reduce overall processing time while preventing detection miss of an image-capturing target.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-081193, filed May 1, 2020, which is hereby incorporated by reference herein in its entirety.

What is claimed is:

1. An apparatus comprising:
a processor; and
a memory storing a program which, when executed by the processor, causes the processor to:
  detect a plurality of areas from an image;
  execute first determination processing on each of the plurality of areas to determine whether each of the plurality of areas is a candidate for an area including a specific object based on a determination reference value stored in a storage unit;
  control an imaging apparatus to capture a zoom-in image of an area, out of the plurality of areas, determined as the candidate for the area including the specific object in the first determination processing;
  receive the captured zoom-in image;
  execute second determination processing on the zoom-in image to determine whether the zoom-in image includes the specific object; and
  identify the area corresponding to the zoom-in image determined not to include the specific object in the second determination processing, and update the stored determination reference value based on image information of the identified area,
wherein reading processing on the zoom-in image is performed in the second determination processing, to determine that the zoom-in image as a target for reading includes the specific object if the reading processing has succeeded, and to determine that the zoom-in image as the target for the reading does not include the specific object if the reading processing has failed.

2. The apparatus according to claim 1,
wherein it is determined, in the first determination processing, whether each of the plurality of areas is the candidate for the area including the specific object using the image information for each of the plurality of areas, and
wherein the determination reference value is updated based on the image information used in the first determination processing.

3. The apparatus according to claim 1,
wherein the image information indicates an image feature quantity of the area.

4. The apparatus according to claim 3,
wherein the determination reference value is a predetermined threshold of the image feature quantity, and
wherein it is determined that the area is the candidate for the area including the specific object in a case where the image feature quantity of the area is within a range defined by the predetermined threshold.

5. The apparatus according to claim 4,
wherein a limit value is set to the determination reference value, and
wherein the determination reference value is updated in a case where the image feature quantity of the area does not exceed the limit value, and the determination reference value is not updated in a case where the image feature quantity of the area exceeds the limit value.

6. The apparatus according to claim 3, wherein the image feature quantity is a feature quantity regarding a density of the image and/or a feature quantity regarding a color of the image.

7. The apparatus according to claim 1, wherein a plurality of the determination reference values is stored in the storage unit, and wherein part of the plurality of determination reference values is updated.

8. The apparatus according to claim 1, wherein the specific object is at least one of a barcode, a quick response (QR) code, or a character string.

9. The apparatus according to claim 1, wherein the program when executed by the processor further causes the processor to
perform reading processing on the zoom-in image determined to include the specific object in the second determination processing.

10. The apparatus according to claim 1, wherein it is determined, in the second determination processing, whether the zoom-in image includes the specific object based on image information of the zoom-in image.

11. The apparatus according to claim 1, wherein it is determined, in the second determination processing, whether the zoom-in image includes the specific object based on a result obtained by performing character recognition processing and/or matching processing on the zoom-in image.

12. The apparatus according to claim 1, wherein execute the first determination processing and the second determination processing are performed sequentially on the plurality of areas, and the determination reference value is acquired from the storage unit after executing the second determination processing on a previous area and before executing the first determination processing on a next area.

13. The apparatus according to claim 1, wherein the first determination processing is sequentially execute on the plurality of areas, and the first determination processing is executed on a last area based on the determination reference value acquired from the storage unit before executing the first determination processing on a first area.

14. The apparatus according to claim 1, wherein matching processing is performed between the image and a model image including the specific object, and the area is detected from the image based on a result of the matching processing.

15. The apparatus according to claim 1, wherein a result of determination in the first determination processing and a result of determination in the second determination processing are displayed in association with positions of the plurality of areas in the image.

16. The apparatus according to claim 1, wherein a notification indicating that the determination reference value is updated is made, if the determination reference value is updated.

17. A method of an apparatus, the method comprising:
detecting a plurality of areas included in an overall image from the overall image;
executing first determination processing on each of the plurality of areas in the overall image to determine whether each of the plurality of areas is a candidate for an area including an object as a processing target based on a determination reference value stored in a storage unit;
controlling an imaging apparatus to capture a zoom-in image of an area determined as the candidate for the area including the object in the first determination processing out of the plurality of areas in the overall image;
receiving the captured zoom-in image from the imaging apparatus;
executing second determination processing on the zoom-in image to determine whether the zoom-in image is an image of the object; and
identifying an area, in the overall image, corresponding to the zoom-in image determined not to be the image of the object in the second determination processing, and performing control to update the determination reference value based on image information of the identified area;
wherein reading processing on the zoom-in image is performed in the second determination processing, to determine that the zoom-in image as a target for reading includes the specific object if the reading processing has succeeded, and to determine that the zoom-in image as the target for the reading does not include the specific object if the reading processing has failed.

18. A non-transitory computer-readable storage medium storing a program for executing a method, the method comprising:
detecting a plurality of areas included in an overall image from the overall image;
executing first determination processing on each of the plurality of areas in the overall image to determine whether each of the plurality of areas is a candidate for an area including an object as a processing target based on a determination reference value stored in a storage unit;
controlling an imaging apparatus to capture a zoom-in image of an area determined as the candidate for the area including the object in the first determination processing out of the plurality of areas in the overall image;
receiving the captured zoom-in image from the imaging apparatus;
executing second determination processing on the zoom-in image to determine whether the zoom-in image is an image of the object; and
identifying an area, in the overall image, corresponding to the zoom-in image determined not to be the image of the object in the second determination processing, and performing control to update the determination reference value based on image information of the identified area,
wherein reading processing on the zoom-in image is performed in the second determination processing, to determine that the zoom-in image as a target for reading includes the specific object if the reading processing has succeeded, and to determine that the zoom-in image as the target for the reading does not include the specific object if the reading processing has failed.

* * * * *